(12) United States Patent
Suzuki et al.

(10) Patent No.: US 11,835,080 B2
(45) Date of Patent: Dec. 5, 2023

(54) ANTI-LOOSENING METALLIC EXTERNALLY THREADED FASTENER

(71) Applicants: YAHATA HOLDINGS CORPORATION, Aichi-Ken (JP); WORLD LOCK CORPORATION, Hyogo-Ken (JP)

(72) Inventors: Noriyuki Suzuki, Kitanagoya (JP); Yoshirou Haze, Himeji (JP)

(73) Assignees: YAHATA HOLDINGS CORPORATION, Kitanagoya (JP); WORLD LOCK CORPORATION, Himeji (JP)

(*) Notice: Subject to any disclaimer, the term of this patent is extended or adjusted under 35 U.S.C. 154(b) by 361 days.

(21) Appl. No.: 17/059,427

(22) PCT Filed: Jun. 13, 2019

(86) PCT No.: PCT/JP2019/023428
§ 371 (c)(1),
(2) Date: Nov. 27, 2020

(87) PCT Pub. No.: WO2019/244759
PCT Pub. Date: Dec. 26, 2019

(65) Prior Publication Data
US 2021/0156414 A1    May 27, 2021

(30) Foreign Application Priority Data

Jun. 19, 2018 (JP) .................. 2018-116109

(51) Int. Cl.
*F16B 39/30* (2006.01)
*F16B 33/02* (2006.01)

(52) U.S. Cl.
CPC .............. *F16B 39/30* (2013.01); *F16B 33/02* (2013.01)

(58) Field of Classification Search
CPC .................................. F16B 39/30; F16B 33/02
(Continued)

(56) References Cited

U.S. PATENT DOCUMENTS 1,451,484 A * 4/1923 Woodward ............ F16B 39/30
411/311
3,394,626 A * 7/1968 Oliver .................... F16B 33/02
411/411
(Continued)

FOREIGN PATENT DOCUMENTS

CN 105485140 A * 4/2016 .............. F16B 33/02
JP 2014-37893 2/2014
(Continued)

*Primary Examiner* — Victor D Batson
*Assistant Examiner* — Jock Wong
(74) *Attorney, Agent, or Firm* — J-PAT U.S. PATENT LEGAL SERVICES; James Judge

(57) ABSTRACT

[Problem] The purpose of the present invention is to provide an anti-loosening metallic male screw that can exhibit a sufficient anti-loosening effect by forming a flat part and a short slope in a part of the thread bottom of the male screw and thus ensuring pressure contact between a thread peak of a female screw and the slope at the thread bottom of the male screw. [Solution] An anti-loosening metallic male screw according to the present invention is to be engaged with a female screw for a metric screw, and is characterized in that the cross-sectional shape of the thread bottom of the metallic male screw is formed into a flat shape in which a non-pressurized flank side thereof is parallel to the axis of the male screw, is formed into a shape in which a pressurized flank side thereof is sloped toward the pressurized flank side with respect to an extension line of the flat part, and the outer diameter and the effective radial size of the metallic male screw are smaller than the reference sizes of the metric screw.

5 Claims, 22 Drawing Sheets

(58) Field of Classification Search
USPC .................... 411/308, 309, 310, 311, 411
See application file for complete search history.

(56) References Cited

U.S. PATENT DOCUMENTS

| | | | | |
|---|---|---|---|---|
| 3,907,017 | A * | 9/1975 | Stanwick | ................ F16B 39/30 411/311 |
| 2002/0025240 | A1* | 2/2002 | Ward | ................... F16B 35/007 411/307 |
| 2002/0136616 | A1* | 9/2002 | Birkelbach | ......... F16B 25/0047 411/411 |
| 2009/0116929 | A1* | 5/2009 | Shea | ....................... F16B 39/30 411/311 |
| 2016/0153486 | A1* | 6/2016 | Xu | .......................... F16B 39/30 411/265 |
| 2017/0030393 | A1* | 2/2017 | Phua | ...................... F16B 39/30 |

FOREIGN PATENT DOCUMENTS

| | | |
|---|---|---|
| JP | 2016-524681 | 8/2016 |
| WO | WO2017-187383 | 11/2017 |

* cited by examiner

| Beveled-Section-Featuring Externally Threaded Fastener | | Binding Force[N] | | | | |
|---|---|---|---|---|---|---|
| | | No. 1 Thread | No. 2 Thread | No. 3 Thread | No. 4 Thread | No. 5 Thread |
| | none | 226 | 154 | 131 | 127 | 138 |
| Wedge Angle [degrees] | 28 | 672 | 623 | 631 | 623 | 668 |
| | 29 | 647 | 605 | 611 | 599 | 607 |
| | 30 | 618 | 598 | 591 | 582 | 586 |
| | 31 | 573 | 566 | 554 | 551 | 565 |
| | 33 | 522 | 507 | 515 | 507 | 511 |
| | 35 | 505 | 496 | 501 | 493 | 497 |

*Fig. 12*

| Beveled-Section-Featuring Internally Threaded Fastener | | Binding Force[N] | | | | |
|---|---|---|---|---|---|---|
| | | No. 1 Thread | No. 2 Thread | No. 3 Thread | No. 4 Thread | No. 5 Thread |
| Wedge Angle [degrees] | none | 226 | 187 | 154 | 134 | 131 |
| | 24 | 343 | 284 | 247 | 227 | 233 |
| | 25 | 472 | 440 | 423 | 416 | 431 |
| | 27 | 447 | 420 | 405 | 399 | 411 |
| | 30 | 398 | 373 | 358 | 351 | 361 |
| | 33 | 410 | 373 | 346 | 331 | 344 |
| | 35 | 392 | 357 | 340 | 326 | 335 |
| | 37 | 401 | 356 | 326 | 309 | 318 |
| | 39 | 383 | 330 | 295 | 276 | 284 |

ANTI-LOOSENING METALLIC EXTERNALLY THREADED FASTENER

TECHNICAL FIELD

The present invention relates to externally threaded fasteners employed in joining of machine-tool and transport-machinery fixtures as well as construction-machinery fixtures, and in parts fastening, etc., and that by serving to curtail fastening time and improve parts-fastening safety are conducive to improving working environments.

BACKGROUND TECHNOLOGY

To date, joining that is by fastening parts has been carried out based on JIS standards by means of hex-socket bolts (JIS B1176), hex bolts (JIS B1180), and the like. Joining together of fastened objects is carried out via axial force in the drawing-together direction that is produced in externally threaded fasteners by the tightening down of the fasteners, and via compressive force, acting opposite to the axial force, that is produced in the fastened objects. When the fasteners have been tightened down right, the axial forces and the compressive forces are in balance, wherein the joint is firmly and stably maintained.

With the lapse of time, due to vibrations and the like in the device in which the fastened objects are mounted, the tightened-down state alters, upsetting the equilibrium between the axial forces and the compressive forces, and giving rise to loosening of the threaded fasteners. In some cases, loosening of the threaded fasteners can lead to serious incidents, including dropping out of, or fatigue failure of, the externally threaded fasteners.

On the other hand, if over-tightened with a large force, threaded fasteners can become stretched, and fatiguing of the fastened objects can occur. In order to avert the occurrence of accidents with threaded fasteners being the cause, clamping correctly, with force (tighten-down torque) that is prescribed relative to the fastened objects, is demanded for the tightening down of threaded fasteners.

Threaded-fastener loosening includes slackening in which rotation of the threaded fastener is not the causative factor—initial slackening, settlement slackening, and slackening whose causative factor is the fastened object etc., other than the threaded fastener—and rotational looseness in which looseness arises when external force acts on the fastened objects, and either the externally threaded fastener or the internally threaded fastener reverse-rotates.

In these ways, even in cases where optimal tightening has been carried out, loosening will sometimes arise, putting the prevention of loosening in an exceedingly challenging situation, such that the development of threaded fasteners that may be employed worry-free and can reliably prevent loosening has been arduously hoped for from the industrial sector.

Taking the above-described circumstances into consideration, various anti-loosening threaded fasteners are being developed. Disclosed in Patent Document 1 is an anti-loosening threaded fastener in which on an externally threaded fastener, summit regions whose flank angle on the pressured side is formed smaller than the flank angle on the other side are constituted in a triangular form with summit regions being tri-point apices, and in which beveled projections, constituted in a beveled form heading from a bevel face along the pressured-side flank angle of the externally threaded fastener toward the root diameter, are formed jutting toward the root-diameter region of the externally threaded fastener, and between the pressured-side flank angle of the externally threaded fastener and the flank angle of an opposing internally threaded fastener, a spatial zone is formed, wherein when the externally threaded fastener is screw-inserted into the internally threaded fastener, the beveled projections are pressure-contacted against summit regions that are the tip ends of the internally threaded fastener along its inner diameter, and at the same time the tri-point summit regions of the externally threaded fastener are caused to bite into the root-diameter side of the internally threaded fastener and abut on a flank angle of the internally threaded fastener that opposes the flank angle of the externally threaded fastener.

Also, the present inventors invented, and disclosed in Patent Document 2, an anti-loosening threaded fastener provided with a bevel on the root portion of an internally threaded fastener. Disclosed in Patent Document 2 is, in nuts that mate with metric-screw bolts, an anti-loosening nut in which the nut root portion in cross-sectional form is configured providing a beveled section slanted at from 24.5 degrees to 27 degrees with respect to the axis, on a compressing flank face on the side where a load acts during tightening, and with threads enlarging the screw dimensions over screw reference dimensions.

PRECEDENT TECHNICAL LITERATURE

Patent Documents

Patent Document 1: Gazette U.S. Pat. No. 4,361,128
Patent Document 2: Gazette U.S. Pat. No. 4,974,312

SUMMARY OF INVENTION

Issues Invention is to Resolve

From results of analyzing finite elements of a threaded fastener, it is understood that in general during the tightening of a threaded fastener, an approximately 44% load is applied to the No. 1 thread along the seat, while an approximately 30% load is exerted on the No. 2 thread and an approximately 26% on the No. 3 thread, and thus that the exceedingly greater part of the load is exerted on the No. 1 thread on an externally threaded fastener along the seat. This imbalance in load, with plastic deformation occurring along the seat and micro-gaps occurring along the externally threaded fastener tip, is the primary cause of thread fracture in an externally threaded fastener and threaded-fastener looseness.

With Patent Document 1, a problem has been that from the point the threaded fastener is inserted into a nut, the fastener flank on the non-compressing side comes into contact with the nut, giving rise to frictional torque, such that in the assembly job, if a wrench or the like is not employed to hold the nut-end of the assembly fixed, the threaded fastener cannot be turned. In particular, in the latter half of the tightening job, because the flank on the compressing side of the externally threaded fastener and the internally-threaded-fastener crest corner portions, as well as the externally-threaded-fastener crest portion constituted with the special geometry and the internally-threaded-fastener root, are brought forcefully into abutment, deforming the geometry of the threads and giving rise to frictional torque, for the tightening that is carried out, with the externally-threaded-fastener head and the internally threaded fastener both held fixed with a wrench or the like, an extraordinarily large force has been required.

In Patent Document 2, the internally-threaded-fastener root in its entirety is formed as a beveled section, wherein it was anticipated that a sufficient anti-loosening effect would be demonstrated on any sort of externally threaded fastener, but with externally-threaded-fastener dimensions near the lower limit of JIS standard 6 g accuracy, it was discovered that the crest tip of the externally-threaded-fastener threads for the most part did not abut on the beveled section of the internally-threaded-fastener root, such that the anti-loosening effect could not be demonstrated.

To explain in more detail: In the internally threaded fastener being screwed together with an externally threaded fastener of JIS standard 6 g accuracy (Class 2 accuracy), although theoretically, the crest of the externally-threaded-fastener threads should come into abutment with the beveled section of the internally threaded fastener in a position shifted by 0.048 mm heading from its compressing-flank side to its non-compressing-flank side, with actual externally threaded fasteners near the lower limit of JIS standard 6 g accuracy, round curved-surface processing (so-called R-machining; will be "R-machining" hereinafter) has been implemented on the thread crests, wherein there have been instances in which they only slightly abut on the internally-threaded-fastener root beveled section.

Further, in the internally threaded fastener being screwed together with an externally threaded fastener of JIS standard 8 g accuracy (Class 3 accuracy), if the externally-threaded-fastener outer diameter is near the accuracy lower limit, although theoretically, the crest of the externally-threaded-fastener threads should come into abutment with the beveled section of the internally threaded fastener in a position shifted by 0.023 mm heading from its compressing-flank side to its non-compressing-flank side, with actual externally threaded fasteners, R-machining has been implemented on the thread crests, wherein they do not abut on the internally-threaded-fastener root beveled section.

An object of the present invention, brought about taking the above-described issues into consideration, is to make available an anti-loosening metallic externally threaded fastener in which by a planar section and a short beveled section being formed on part of the root of the externally threaded fastener, the crests of the internally-threaded-fastener threads and the beveled section of the externally-threaded-fastener root pressure-contact reliably, enabling sufficient anti-loosening effectiveness to be demonstrated.

Means for Resolving the Issues

In order to resolve the above-described issues, an anti-loosening metallic externally threaded fastener of the present invention, in metallic externally threaded fasteners for interlocking with metric-screw internally threaded fasteners, is characterized in being formed with: the roots, in cross-sectional form, of the metallic externally threaded fastener constituted with a side (will be "planar section" hereinafter) along a non-compressing flank of the threads being in a planar form paralleling the axis of the externally threaded fastener, and constituted with a side (will be "beveled section" hereinafter) along a compressing flank of the threads being in a form beveled, with respect to a line extending from the planar section, heading toward the compressing flank; and the outer-diametric dimension and the effective-diametric dimension of the metallic externally threaded fastener being smaller than metric-screw reference dimensions.

Further, the anti-loosening metallic externally threaded fastener of the present invention is characterized in that in being screw-clamped together with an internally threaded fastener, the beveled section, and a thread-crest corner portion along the compressing flank of the internally threaded fastener, alone are brought into pressure-contact.

Further, the anti-loosening metallic externally threaded fastener of the present invention is characterized in being constituted in a form in which the angle of the beveled section is sloped heading toward the compressing flank at an angle with respect to the axis of the threaded fastener of from 32 degrees to within 37 degrees.

Further, the anti-loosening metallic externally threaded fastener of the present invention is characterized in being constituted with the length from the intersection of the line extending from the planar section and a line extending from the compressing flank, to the intersection of the planar section and the beveled section being determined to be from 0.60 times to within 0.75 times the length from the intersection of the line extending from the planar section and the line extending from the compressing flank, to the edge of the planar section along its non-compressing flank side.

Effects of the Invention

When a standard externally threaded fastener and a standard internally threaded fastener have been screwed together, radially directed binding force generated by axial force that comes into play when the compressing flank of the externally threaded fastener and the compressing flank of the internally threaded fastener come into abutment retains the threaded fasteners with no loosening, but because the abutment is a contacting of surfaces, the radially directed binding force is small. Moreover, in the case in which the anti-loosening structure was formed on the internally threaded fastener, radially directed binding force generated by axial force that comes into play when its beveled part for preventing the internally threaded fastener from coming loose and the crest portion of the externally-threaded-fastener threads come into abutment retains the threaded fasteners with no loosening, but on account of the roundness from R-machining having been implemented on the crest portion of the externally-threaded-fastener threads,
the radially directed binding force at abutment does not grow larger. On the other hand, with an anti-loosening metallic externally threaded fastener involving the present invention, the fact that the crest of standard internally-threaded-fastener threads is constituted in a trapezoidal form having corners is exploited to cause the standard internally-threaded-fastener corner portions and the externally-threaded-fastener beveled section to come into pressure-contact, bringing about the gaining of a large radially directed binding force.

Based on the threaded-fastener-loosening vibration tests specified in the test standards NAS 3350 and NAS 3354, anti-loosening metallic externally threaded fasteners involving the present invention were screwed into hex nuts at a tightening torque of 18 N·m to anchor them to pedestals, after which the threaded fasteners were given 30,000 turns on a per-anchoring-pedestal basis. The unscrewing torque following completion of the test was maintained at 13 N·m or more, wherein the clamping status was normal, and anti-loosening effectiveness was confirmed.

Based on the shear-directed transverse vibration test specified in ISO 16130, anti-loosening metallic externally threaded fasteners involving the present invention were screwed into hex nuts at a tightening torque of 18 N·m to anchor them to pedestals, after which specified vibration was imparted to the threaded fasteners along their shear planes. Favorable results in which 80% of the initial axial force was retained even following completion of the test were obtained.

FIG. 11 is a table presenting, for respective beveled-section wedge angles, the binding force that is applied to the different threads when the tightening torque is 18 N·m. With anti-loosening metallic externally threaded fasteners involving the present invention, as indicated in FIGS. 3A and 3B, due to the fact that the load at the crest corner portion of the internally threaded fasteners is borne by a single point on the short beveled section of the externally-threaded-fastener root, a more or less large load is applied to the No. 1 thread, but it will be understood from the FIG. 11 table that on the rest of the threads the load is applied almost evenly distributed. Accordingly, it is possible to prevent threaded-fastener loosening, and prevent thread fracture and strength fatiguing.

According to anti-loosening metallic externally threaded fasteners involving the present invention, in implementations with internally threaded fasteners of standard dimension, until axial force comes into play by the fasteners' being screwed together, the externally-threaded-fastener beveled section and the crest corner part of the internally-threaded-fastener threads either do not come into abutment, or else even if abutting they do not pressure-contact to the extent that a significant load-burden arises, such that the threaded fasteners can be tightened in the same way as with standard-item threaded fasteners, without employing instruments.

BRIEF DESCRIPTION OF DRAWINGS

FIG. 10 is a table representing a situation in which an M8 externally threaded fastener with a beveled section has been tightened against a standard internally threaded fastener 20 in relation to the M8 threaded fastener wedge angle and wedge length.

FIG. 11 is a table presenting binding force for different threads versus wedge angle for externally threaded fasteners provided with the wedge angles and the wedge lengths, in a state of having been tightened.

FIG. 12 is a table presenting binding force for different threads versus wedge angle for internally threaded fasteners given the wedge angle, in a state of having been tightened.

MODES FOR EMBODYING THE INVENTION

Figure 1:
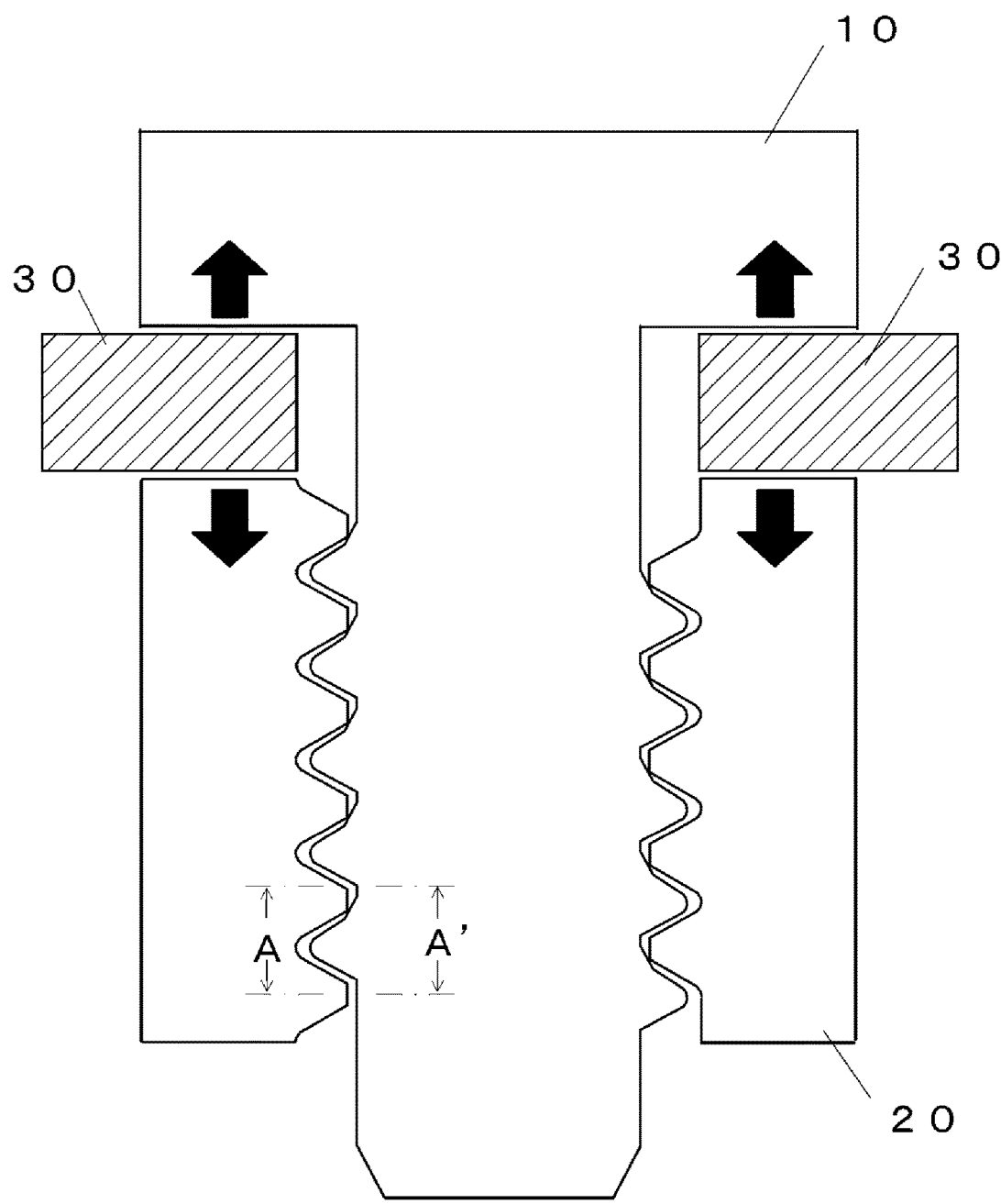
FIG. 1 is a conceptual diagram of a situation in which an anti-loosening metallic externally threaded fastener 10 involving the present invention is being used in an internally threaded fastener 20 to retain a fastened object 30.

While referring to the drawings, an explanation of modes for embodying an anti-loosening metallic externally threaded fastener 10 involving the present invention will be made.

Figure 2:
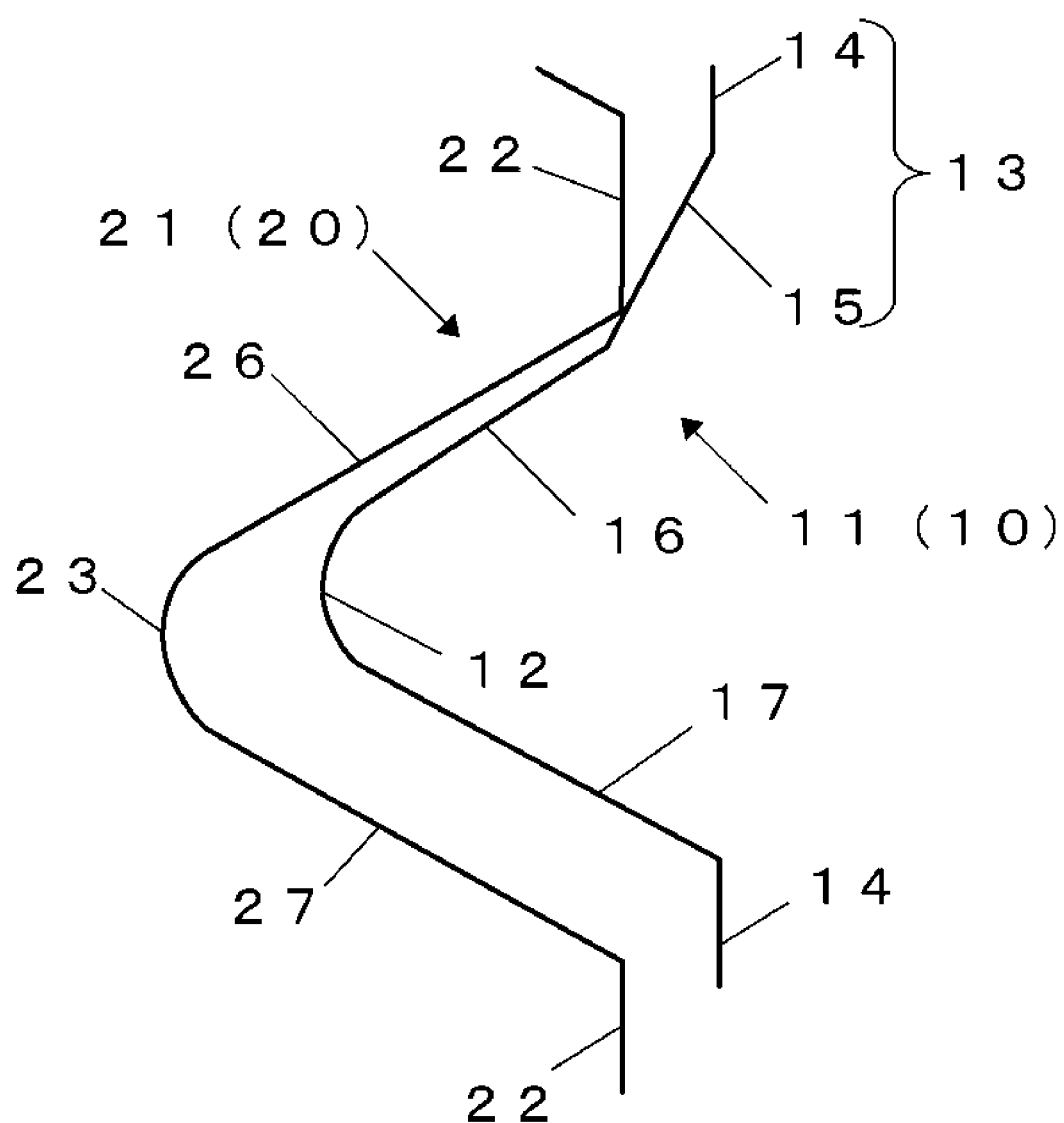
FIG. 2 is an enlarged view of areas in FIG. 1 indicated respectively in the externally threaded fastener 10 and in the internally threaded fastener 20 by dashed lines, with the span of those areas indicated by arrows A and A'.

FIG. 1 is a conceptual diagram of a situation in which an anti-loosening metallic externally threaded fastener 10 involving the present invention is being used. FIG. 2 is an A-A' enlarged view. The figures illustrate the anti-loosening metallic externally threaded fastener 10 and a standard internally threaded fastener 20, in a state of having been tightened with a predetermined tightening torque and in which a fastened object 30 is sandwiched between them. The threaded fasteners in all figures are in cross-sectional view, with oblique parallel lines omitted due to the necessity for auxiliary lines in explanation. The root 13 of the anti-loosening metallic externally threaded fastener 10 is constituted by a planar section 14 and a beveled section 15. Because machining methods that bore a pilot through-hole and then form threads with an internal-thread chasing tool are dominant, the crests 22 in the threaded hole of the standard internally threaded fastener 20 are furnished with corner portions.

In the tightened state, an axial force (stress) acts on the anti-loosening metallic externally threaded fastener 10 in the directions of stretching vertically up-and-down. On the other hand, an axial force (stress) acts on the standard internally threaded fastener 20 in the directions of compressing vertically up-and-down. Thus, the upward-looking flank of the anti-loosening metallic externally threaded fastener 10 serves as a compressing flank 16, while the downward-looking flank of the standard internally threaded fastener 20 serves as a compressing flank 26. FIGS. 1 and 2 illustrate a structure that can prevent loosening by pressing corner portions of the crests 22 of the standard internally threaded fastener 20 on the compressing flank 26 side against the beveled section 15 of the anti-loosening metallic externally threaded fastener 10, creating a binding force along the radius of the threaded fastener. As will be appreciated from FIG. 1, the different threads 11 are pressed against at only one point in the same place. The crest 12 of the anti-loosening metallic externally threaded fastener 10 and the root 23 of the standard internally threaded fastener 20 are not in contact with each other. The compressing flank and the non-compressing-flank of the anti-loosening metallic externally threaded fastener 10 and the standard internally threaded fastener 20 are not in contact with each other as well.

Figure 3A:
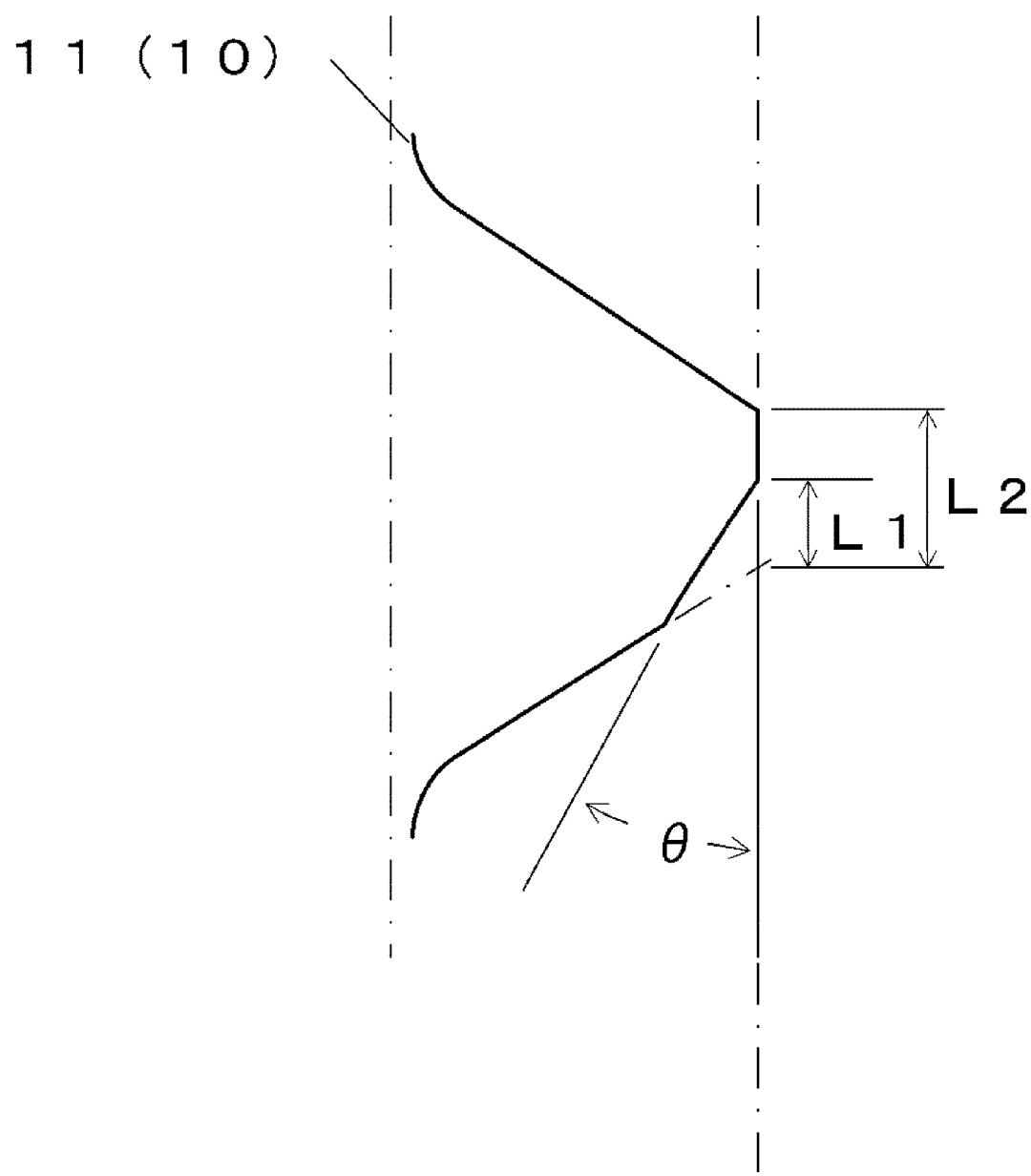
FIG. 3A is a diagram illustrating the form of threads 11, focusing on the root 13 of the anti-loosening metallic externally threaded fastener 10 involving the present invention.

FIG. 3A is a diagram illustrating the form of threads 11, focusing on the root 13 of the anti-loosening metallic externally threaded fastener 10 involving the present invention. The length from the intersection of the line extending from the planar section 14 and the line extending from the compressing flank 16 to the intersection of the planar section 14 and the beveled section 15 is a wedge length L1. The length from the intersection of the line extending from the planar section 14 and the line extending from the compressing flank 16 to the edge of the planar section 14 along its non-compressing flank 17 side is a root length L2. The anti-loosening metallic externally threaded fastener 10 exerts the best anti-loosening effect when the conditions that the wedge length L1 is at least 0.60 times and not more than 0.75 times the root length L2, and that the angle (will be referred to as "wedge angle θ" hereinafter) of the beveled section 15 formed heading toward the compressing flank 16 with respect to the axis of the threaded fastener is at least 32 degrees and not more than 37 degrees are met. Details of how the stated conditions are determined will be described later.

Figure 3B:
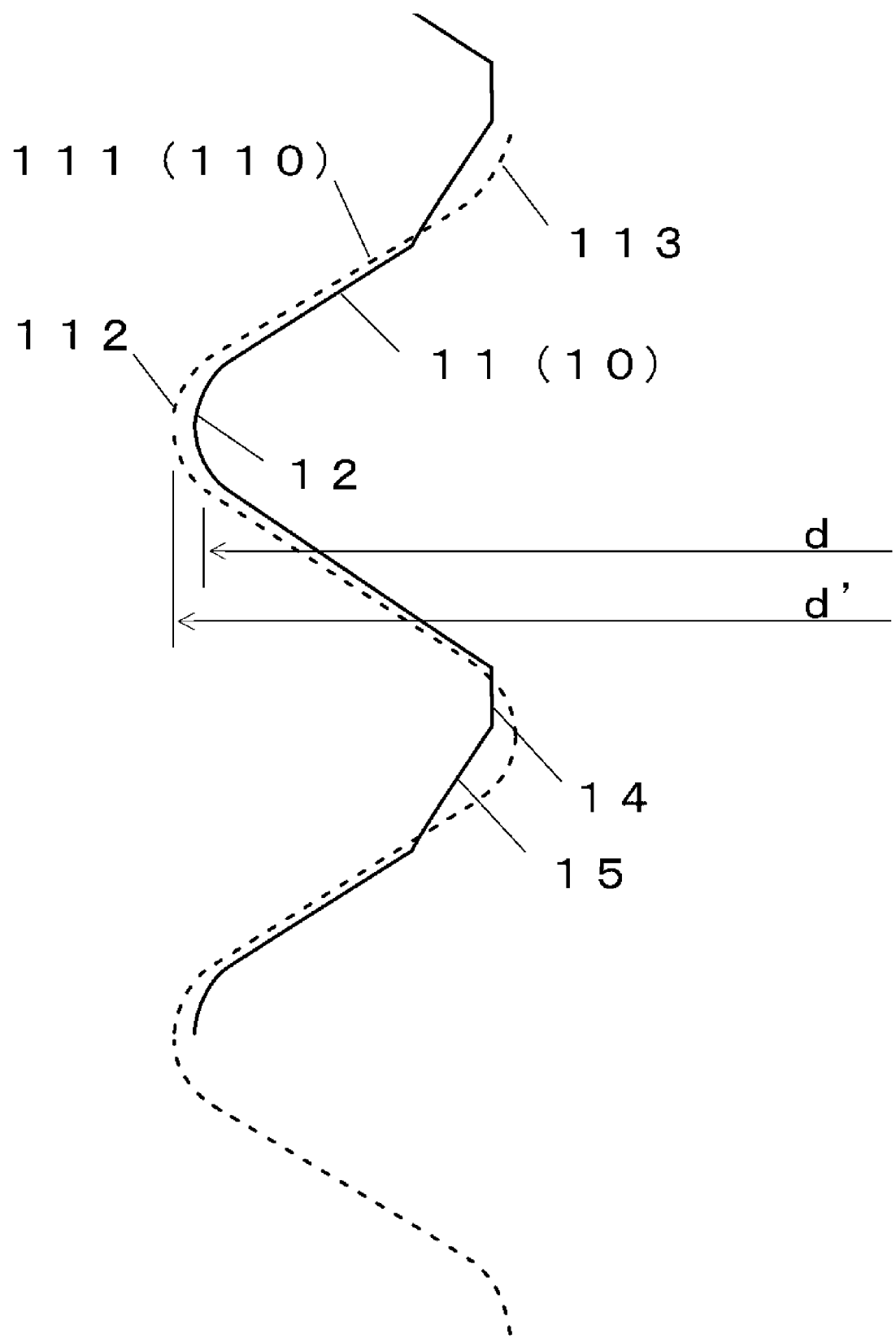
FIG. 3B is a diagram comparing the threads of the anti-loosening metallic externally threaded fastener 10 involving the present invention and a standard externally threaded fastener 110.

FIG. 3B is a diagram comparing the threads of the anti-loosening metallic externally threaded fastener 10 involving the present invention and a standard externally threaded fastener 110. The threads 11 of the anti-loosening metallic externally threaded fastener 10 are indicated by a solid line, while the threads 111 of the standard externally threaded fastener 110 are indicated by a broken line. The outer-diametric dimension d of the anti-loosening metallic externally threaded fastener 10 is constituted smaller than the outer-diametric dimension (metric-screw reference dimension) d' of the standard externally threaded fastener 110, in order to avoid coming into contact with the root 23 of the standard internally threaded fastener 20. On the other hand, the root diameter of the anti-loosening metallic externally threaded fastener 10 having the planar section 14 and the beveled section 15 is constituted greater than the root-diameter dimension (metric-screw reference dimension) of the standard externally threaded fastener 110, in order to press it against a corner portion of the crest 22 of the standard internally threaded fastener 20. If the degree of contact of the beveled section 15 against the corner portion of the standard internally-threaded-fastener 20 crest 22 is set to be excessively strong, however, it would be difficult to turn either the beveled-section-featuring externally threaded fastener 19 or the standard internally threaded fastener 20 without using a screw tightening tool such as a wrench from the beginning of the interlocking between the beveled-section-featuring externally threaded fastener 19 and the standard internally threaded fastener 20. Accordingly, the effective-diametric dimension of the anti-loosening metallic externally threaded fastener 10 is constituted smaller than the effective-diametric dimension (metric-screw reference dimensions) of standard threaded fasteners.

Figure 4A:
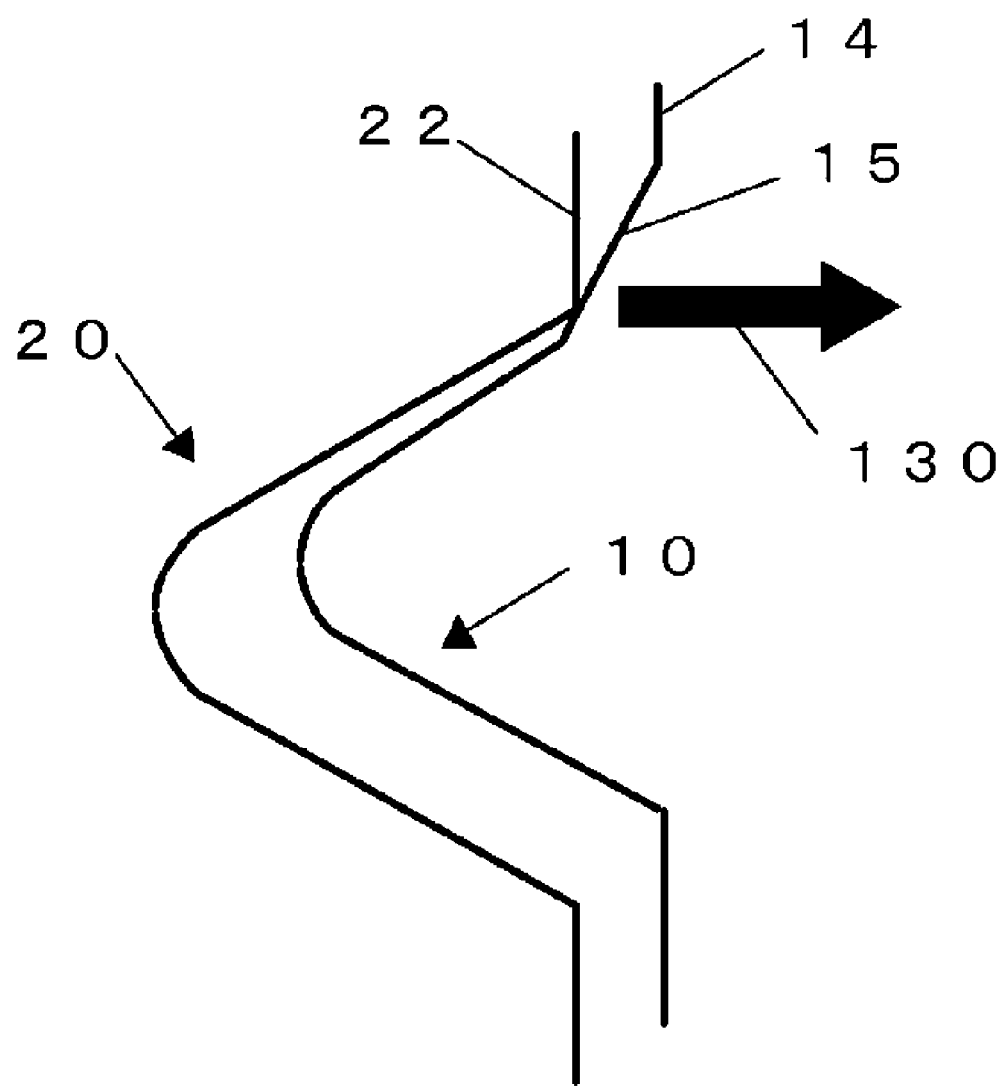
FIG. 4A is a conceptual diagram illustrating a state in which the threads have pressure-contacted when the anti-loosening metallic externally threaded fastener 10 involving the present invention and a standard internally threaded fastener 20 are tightened.

FIG. 4A is a conceptual diagram illustrating a state in which the threads have pressure-contacted when the anti-loosening metallic externally threaded fastener 10 involving the present invention and a standard internally threaded fastener 20 are tightened. As explained for FIG. 2, the corner portion of the standard internally-threaded-fastener 20 crest 22 on the compressing flank 26 side is pressed against the beveled section 15 formed in the root 13 on the compressing flank 16 side of the anti-loosening metallic externally threaded fastener 10. As the screwing together advances and the stress from the fastened object 30 increases, an axial force acts on the threaded fasteners, and the degree to which the corner portion of the crest 22 of the sharp-angled standard internally threaded fastener 20 is engaged with the beveled section 15 of the anti-loosening metallic externally threaded fastener 10 increases. As a result, a large binding force 130 is created along the radius of the threaded fasteners, exerting an enormous anti-loosening effect.

Figure 4B:
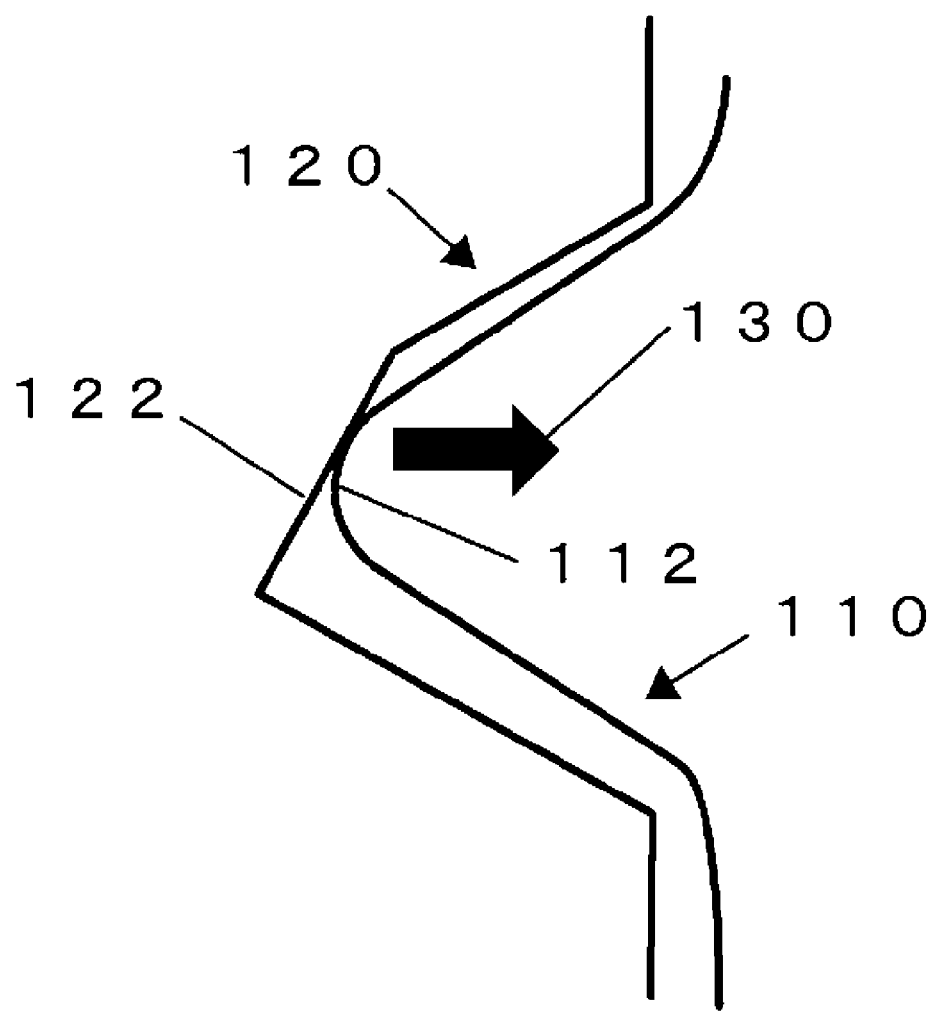
FIG. 4B is a conceptual diagram illustrating a state in which the threads have come into abutment when a standard externally threaded fastener 110 and an internally threaded fastener (anti-loosening internally threaded fastener 120) having a wedge angle are tightened.

FIG. 4B is a conceptual diagram illustrating a state in which the threads have come into abutment when a standard externally threaded fastener 110 and an internally threaded fastener (anti-loosening internally threaded fastener 120) having a wedge angle are tightened. The threads of the standard externally threaded fastener 110, which are formed predominantly by machining with a die or by mill-cutting a rod, is processed such that its crest 112 and root 113 have a rounded, curved surface. When the internally threaded fastener is provided with the beveled section 122 for anti-loosening, the threads on the standard externally threaded fastener 110 are held without loosening by the binding force 130 along the radius generated by the axial force that is created when the beveled section 122 of the internally threaded fastener and the thread crest 112 of the standard externally threaded fastener 110 come into abutment, but the rounded thread crest 112 of the standard externally threaded fastener 110 does not allow the radial binding force 130 at abutment to be utilized to its fullest extent. The anti-loosening effectiveness may be higher in comparison with standard threaded fasteners, but depending on the usage environment, loosening may occur, making application not possible.

Figure 4C:
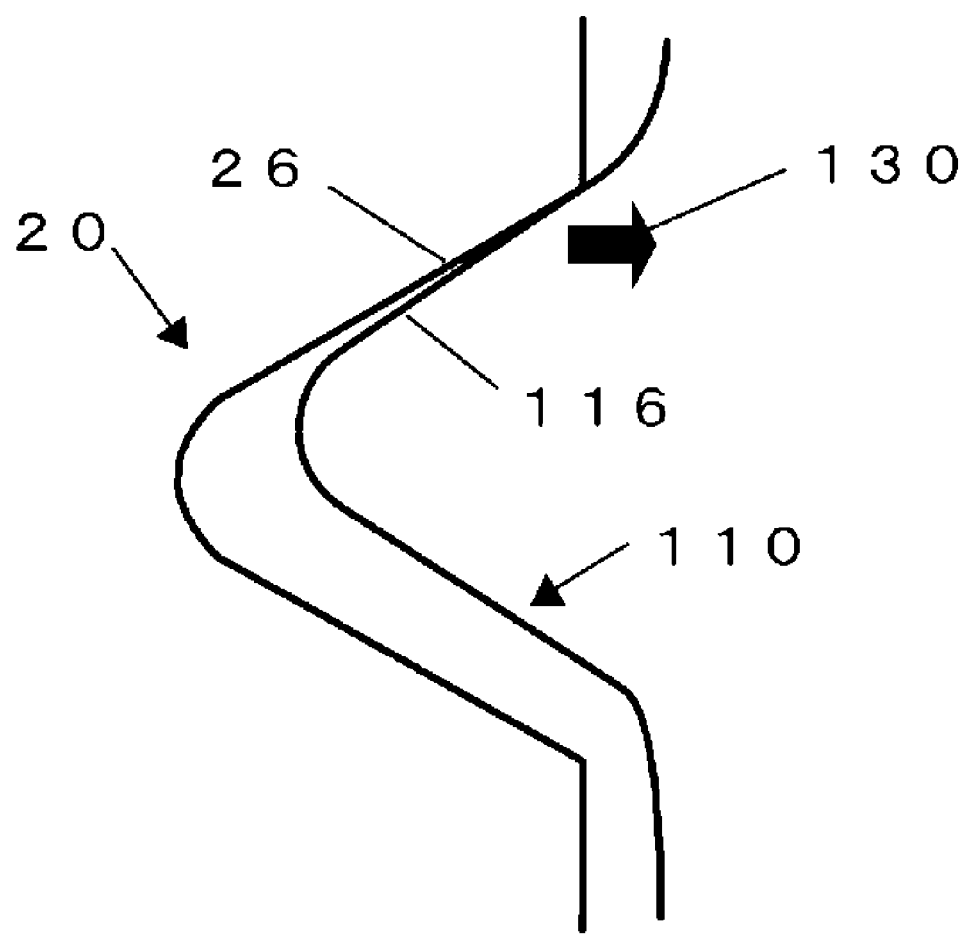
FIG. 4C is a conceptual diagram illustrating a state in which the threads have come into abutment when the standard externally threaded fastener 110 and the standard internally threaded fastener 20 are tightened.

FIG. 4C is a conceptual diagram illustrating a state in which the threads have come into abutment when the standard externally threaded fastener 110 and the standard internally threaded fastener 20 are tightened. The axial force created when a compressing flank 116 of the standard externally threaded fastener 110 and the compressing flank 26 of the standard internally threaded fastener 20 come into abutment generates the binding force 130 along the radius of the threaded fastener, which maintains fastening by the threaded fasteners. Since the compressing flanks are in surface contact with each other, the binding force 130 along the radius of the threaded fastener is small. Accordingly, although in a stationary state unscrewing torque is held in, in an environment with much vibration, continuing to significantly hold in unscrewing torque is challenging, such that the threaded fasteners loosen easily.

The inventors involved in the present invention developed an internally threaded fastener (anti-loosening internally threaded fastener 120) provided with a beveled section 122 in the root in order to prevent loosening to date. Nevertheless, according to a threaded-fastener-loosening vibration test specified in test standard NAS 3350 they found out that as discussed above, when the outer diameter of a standard externally threaded fastener 110 is toward the minimum allowable dimension, the level of abutment of the crest 112 on the standard externally threaded fastener 110 against the beveled section 122 of the internally threaded fastener provided with the anti-loosening beveled section 122 (anti-loosening internally threaded fastener 120) is weak, such that in some cases the anti-loosening effectiveness is not demonstrated. Therein, overturning their approach, by providing a beveled section on the externally-threaded-fastener side to bring the beveled section of the externally threaded fastener into abutment with the corner portion of the thread crest 22 of a standard internally threaded fastener 20, they empirically proved by experiment that the anti-loosening effectiveness is higher than by providing the beveled section 122 on the internally threaded fastener. In the following, the experiments performed are presented, and a description as to details of how the conditions for the externally-threaded-fastener threads were determined is made.

Figure 5:
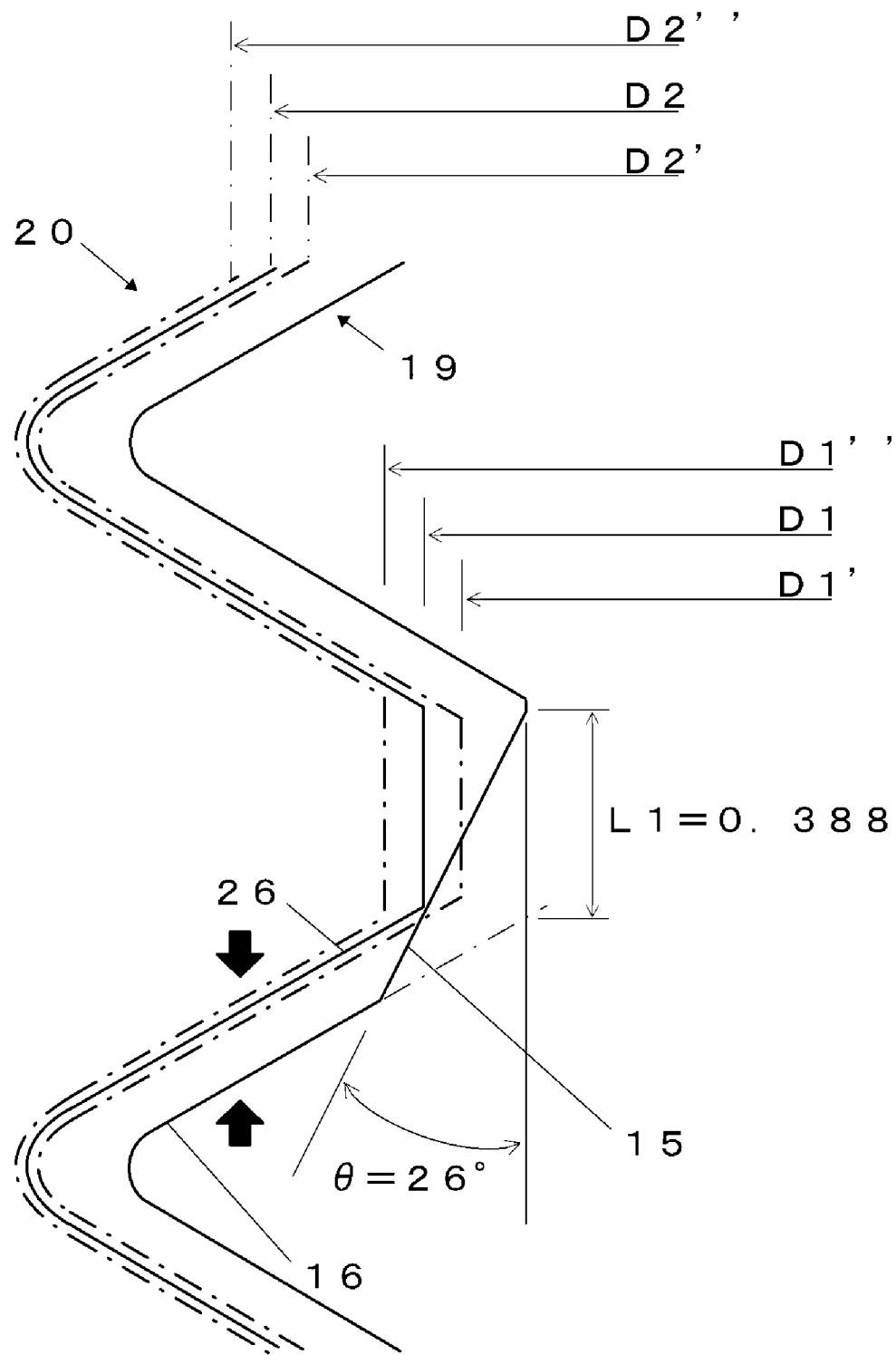
FIG. 5 is a conceptual diagram illustrating a state in which the threads of an M8 externally threaded fastener (beveled-section-featuring externally threaded fastener 19) designed under the conditions of a wedge angle of 26 degrees and a wedge length of 0.388 mm, and a standard internally threaded fastener 20 have come into abutment.

To begin with, optimal conditions for an internally threaded fastener (anti-loosening internally threaded fastener 120) provided with the beveled section 122 in the root for conventional anti-loosening were applied to the root of an externally threaded fastener to check for anti-loosening effectiveness. FIG. 5 is a conceptual diagram illustrating a state in which the threads of an M8 externally threaded fastener (beveled-section-featuring externally threaded fastener 19) designed under the conditions of a wedge angle of 26 degrees and a wedge length of 0.388 mm, and a standard internally threaded fastener 20 have come into abutment. On the left side of the figure are the threads of a standard internally threaded fastener 20. The solid line indicates the standard dimensions. The dashed-dotted line to the left of the solid line represents the maximum dimensions, while the dashed-dotted line to the right of the solid line represents the minimum dimensions. This means that the threads of the standard internally threaded fastener 20 are centered on the standard dimensions represented by the solid line, and range from the minimum dimensions represented by the dashed-dotted line to the maximum dimensions represented by the dashed-dotted line.

The solid line on the right side of the figure represents the standard dimensions of the threads of the beveled-section-featuring externally threaded fastener 19 provided with the anti-loosening beveled section 15. Under the conditions in FIG. 5, the planar section 14 in principle is not formed in the root of the externally threaded fastener. When the beveled-section-featuring externally threaded fastener 19 and the internally threaded fastener are tightened, they move in the directions in which their mutual compressing flanks 16 and 26 come into contact. In other words, the standard internally threaded fastener 20 moves vertically downward in the figure, while the beveled-section-featuring externally threaded fastener 19 moves vertically upward in the figure, generating axial force upon contact.

On that occasion, in order to demonstrate an anti-loosening effect, it is necessary for the beveled section 15 of the beveled-section-featuring externally threaded fastener 19 to contact the corner portion of the thread crest 22 of the standard internally threaded fastener 20, no matter what the dimensions of the standard internally threaded fastener 20, from the minimum to the maximum. Specifically, a straight line extending vertically downward from the thread crest 22 of the standard internally threaded fastener 20 in the figure must intersect the beveled section 15 of externally threaded fastener. In FIG. 5, however, when the standard internally threaded fastener 20 is of maximum dimensions, the intersection is near the compressing flank 16 at the left end of the beveled section 15 of the beveled-section-featuring externally threaded fastener 19. It was accordingly understood that when the standard internally threaded fastener 20 is of maximum dimensions, if the corner portion of the standard internally-threaded-fastener 20 crest 22 has been chamfered, the mutual compressing flanks abut on each other, rendering the binding force 130 along the radius of the threaded fastener small and diluting the anti-loosening effectiveness.

From the experiments of FIG. 5, it was understood that when the wedge angle is set to 26 degrees or smaller, with a standard internally threaded fastener 20 being of greater dimensions than the standard dimensions, it will often be the case that the corner portion of the standard internally-threaded-fastener 20 crest 22 does not abut on the beveled section 15 of the beveled-section-featuring externally threaded fastener 19.

On the other hand, it has been found that with a standard internally threaded fastener 20 being of minimum dimensions, the dashed-dotted line representing the minimum dimensions of the standard internally threaded fastener 20 in FIG. 5 reaches interior of the beveled section 15 of the beveled-section-featuring externally threaded fastener 19 represented by the solid line, and the corner portion of the standard internally-threaded-fastener 20 crest 22 is pressure-contacted on the beveled section 15 of the beveled-section-featuring externally threaded fastener 19 from the beginning of when the beveled-section-featuring externally threaded fastener 19 is engaged with the standard internally threaded fastener 20, such that in some cases the tightening job cannot be carried out unless a tightening tool is employed. Therefore, it is necessary to provide a planar section 14 on the non-compressing-flank 17 side and move the starting point of the beveled section 15 vertically downward in the figure, in implementations in which the dimensions of the standard internally threaded fastener 20 are smaller than the standard, as a measure to prevent the threaded fasteners from being pressed against each other from engagement start. In the following, the condition settings were changed given the results in FIG. 5.

Figure 6A:
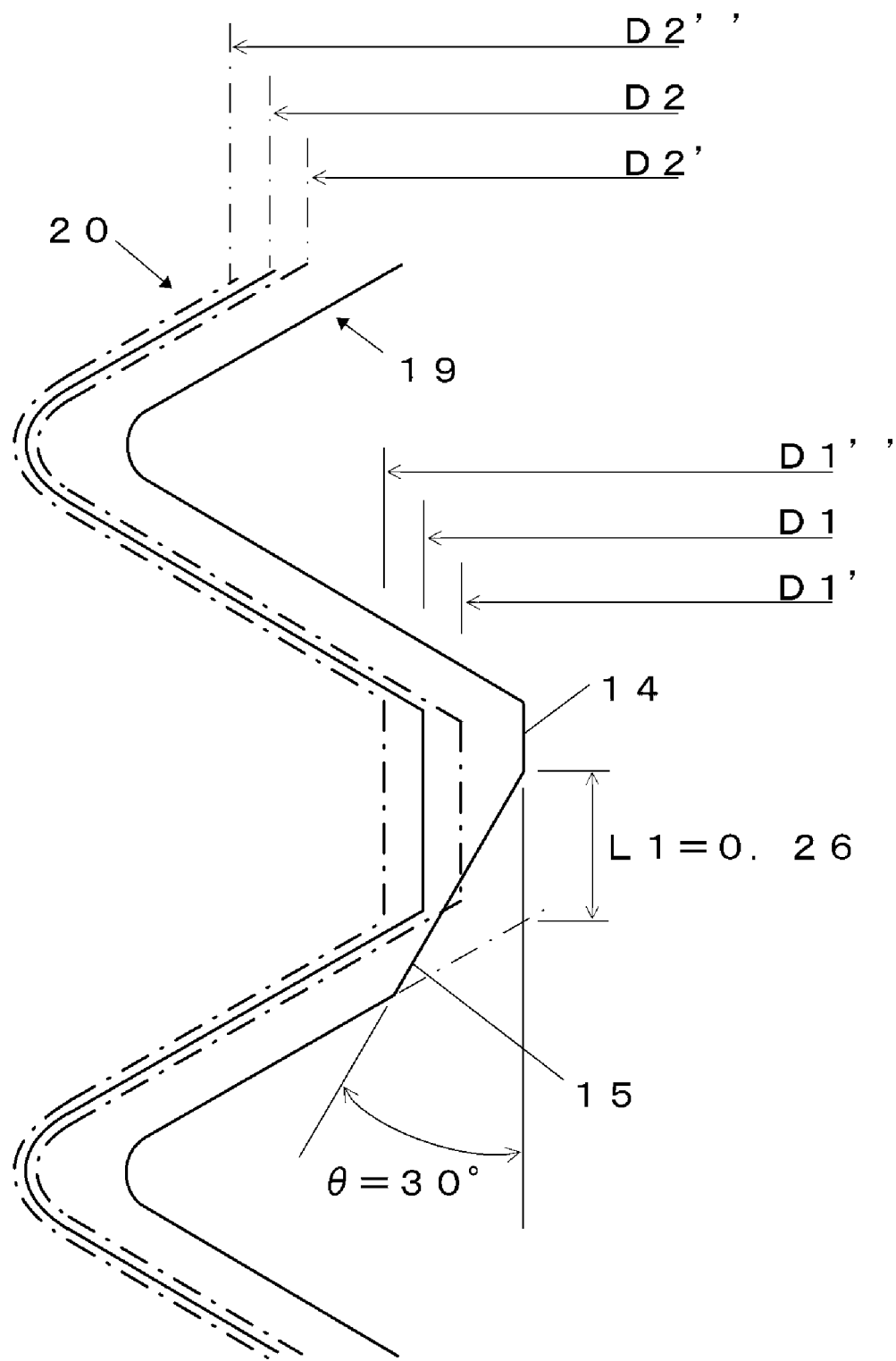
FIG. 6A is a conceptual diagram illustrating a state in which the threads of an M8 externally threaded fastener (beveled-section-featuring externally threaded fastener 19) designed under the conditions of a wedge angle of 30 degrees and a wedge length of 0.26 mm, and the threads of a standard internally threaded fastener 20 have come into abutment.

FIG. 6A is a conceptual diagram illustrating a state in which the threads of an M8 externally threaded fastener (beveled-section-featuring externally threaded fastener 19) designed under the conditions of a wedge angle of 30 degrees and a wedge length of 0.26 mm, and the threads of a standard internally threaded fastener 20 have come into abutment. With the standard internally threaded fastener 20 being of minimum dimensions, pressure-contacting of the threaded fasteners against each other from the engagement start could be averted. With the standard internally threaded fastener 20 being of maximum dimensions, on the other hand, the corner portion of the standard internally-threaded-fastener 20 crest 22 was in a state of not being pressure-contacted on the beveled section 15 of the beveled-section-featuring externally threaded fastener 19 even after their being screwed together advanced.

Figure 6B:
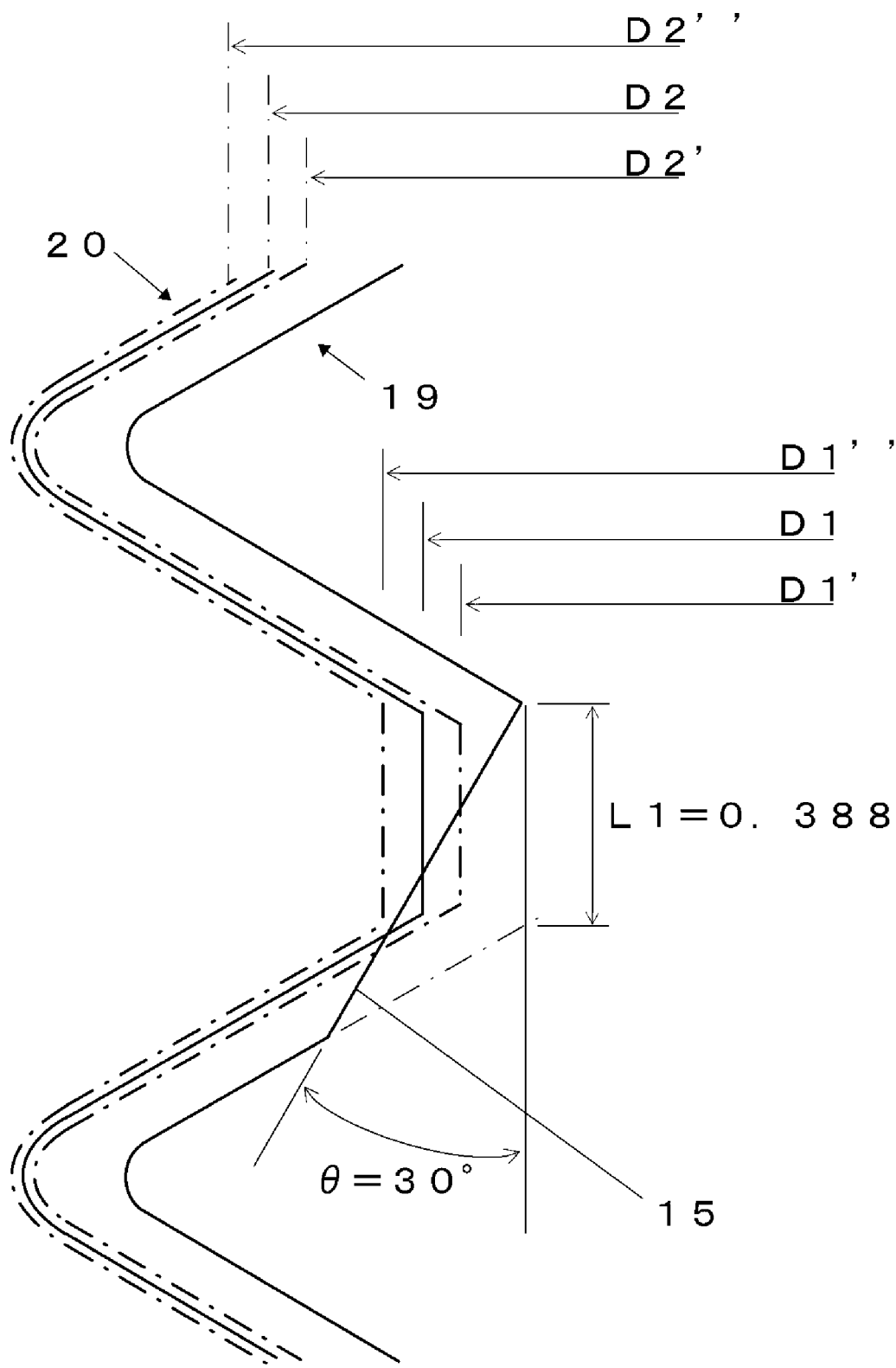
FIG. 6B is a conceptual diagram illustrating a state in which the threads of an M8 externally threaded fastener (beveled-section-featuring externally threaded fastener 19) designed under the conditions of a wedge angle of 30 degrees and a wedge length of 0.388 mm, and the threads of a standard internally threaded fastener 20 have come into abutment.

Herein, a contrasting comparison was made with a wedge-length 0.388 mm not having a planar section. FIG. 6B is a conceptual diagram illustrating a state in which the threads of an M8 externally threaded fastener (beveled-section-featuring externally threaded fastener 19) designed under the conditions of a wedge angle of 30 degrees and a wedge length of 0.388 mm, and the threads of a standard internally threaded fastener 20 have come into abutment. With a standard internally threaded fastener 20 being of maximum dimensions, the corner portion of the standard internally-threaded-fastener 20 crest 22 was in a state of being pressure-contacted on the beveled section 15 of the beveled-section-featuring externally threaded fastener 19 after their being screwed together advanced. With a standard internally threaded fastener 20 being of minimum dimensions, on the other hand, the threaded fasteners were in a state of being pressure-contacted against each other from engagement start.

Figure 7A:
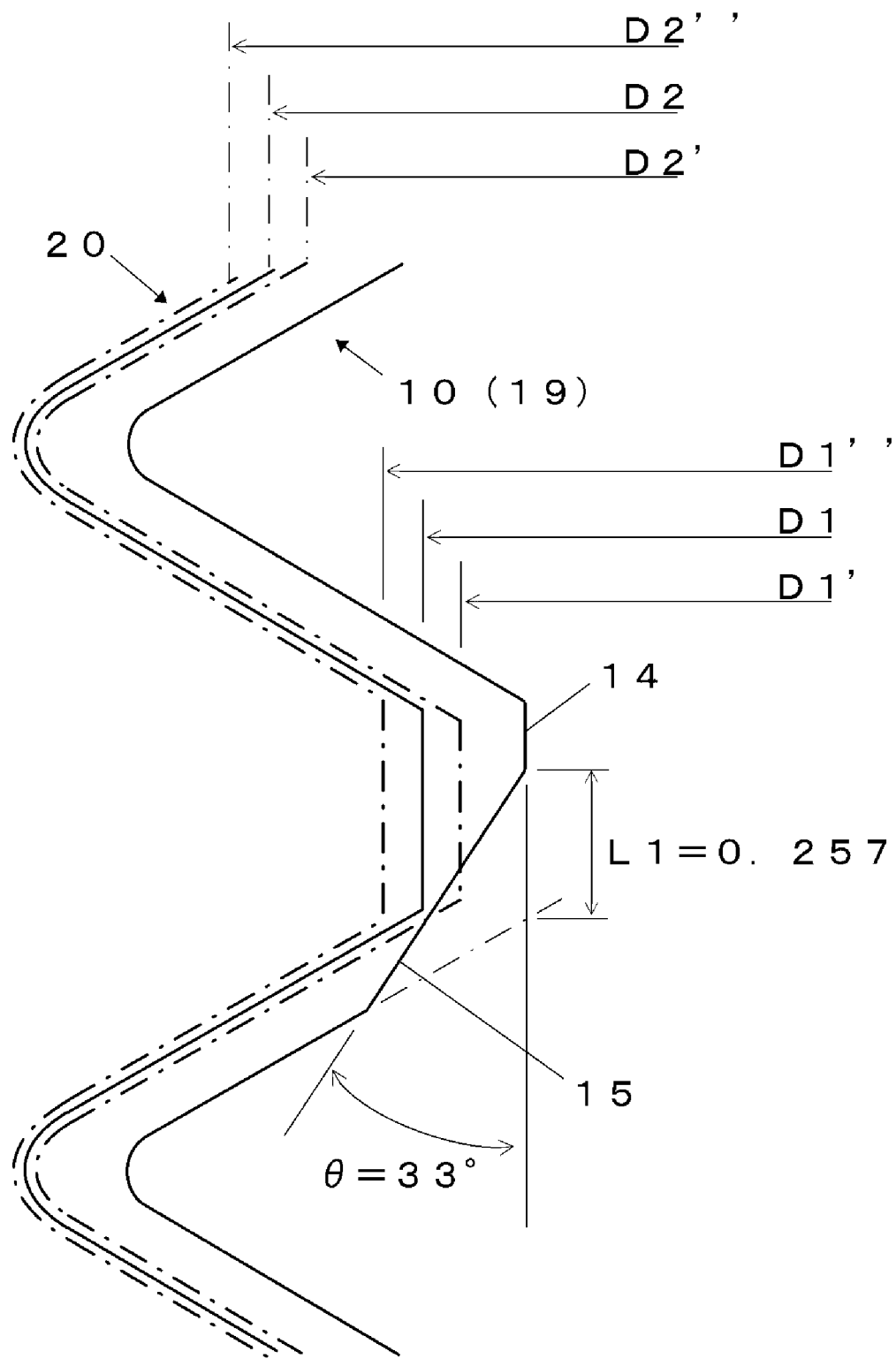
FIG. 7A is a conceptual diagram illustrating a state in which the threads 11 of the anti-loosening metallic externally threaded fastener 10 (M8 externally threaded fastener) involving the present invention, designed under the conditions a wedge angle of 33 degrees and a wedge length of 0.257 mm, and the threads of a standard internally threaded fastener 20 have come into abutment.

FIG. 7A is a conceptual diagram illustrating a state in which the threads 11 of the anti-loosening metallic externally threaded fastener 10 (M8 externally threaded fastener) involving the present invention, designed under the conditions a wedge angle of 33 degrees and a wedge length of 0.257 mm, and the threads of a standard internally threaded fastener 20 have come into abutment. With the standard internally threaded fastener 20 being of minimum dimensions, the threaded fasteners were in light contact with each other from engagement start, but a state of being pressure-contacted against each other could be averted. At the same time, with the standard internally threaded fastener 20 being of maximum dimensions, the corner portion of the standard internally-threaded-fastener 20 crest 22 was put into a state of being pressure-contacted against the beveled section 15 of the beveled-section-featuring externally threaded fastener 19 after their being screwed together advanced. Discovering that the stated condition is one of the conditions whereby anti-loosening effectiveness may be demonstrated was possible.

Figure 7B:
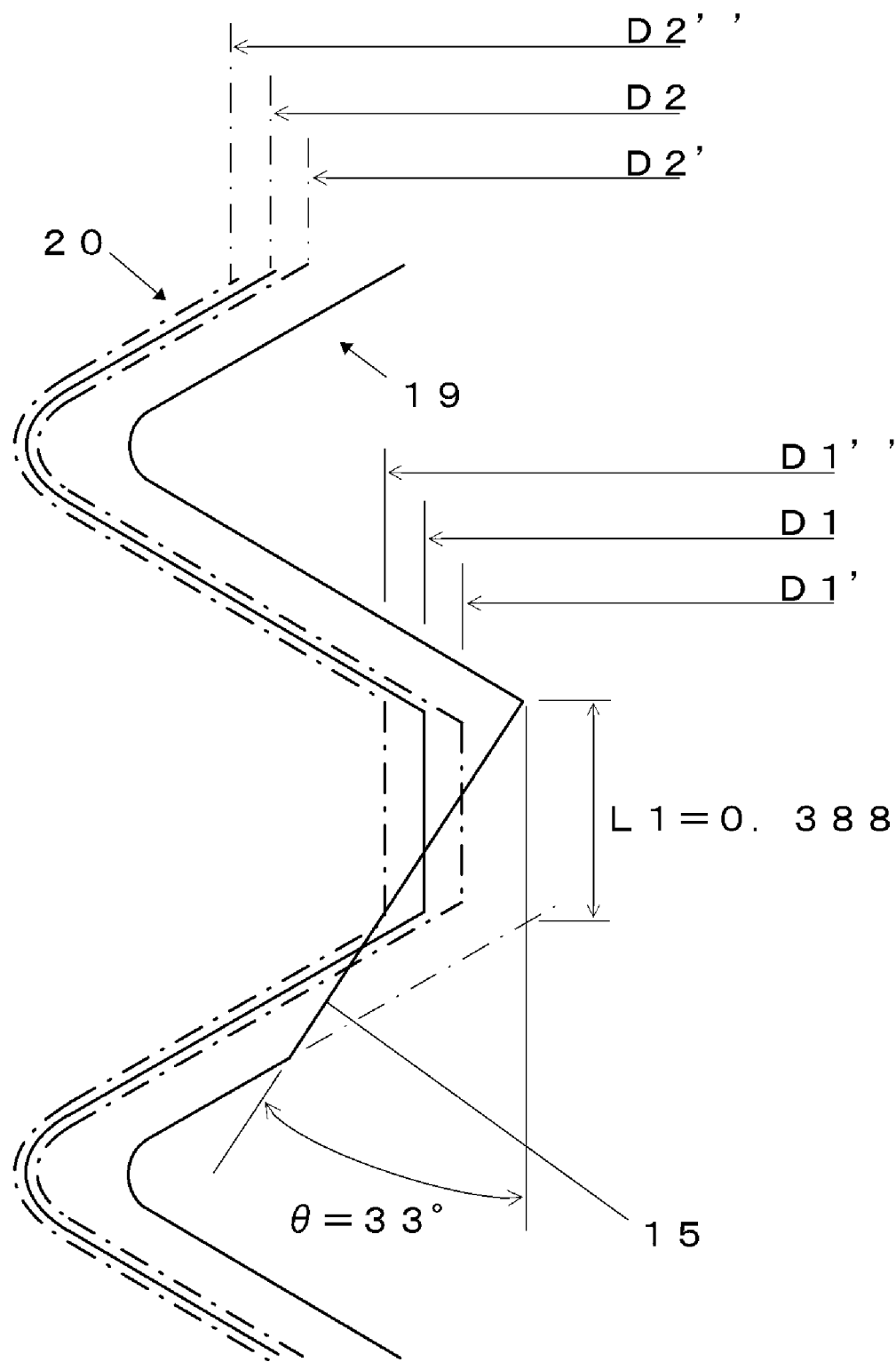
FIG. 7B is a conceptual diagram illustrating a state in which the threads of an M8 externally threaded fastener (beveled-section-featuring externally threaded fastener 19) designed under the conditions of a wedge angle of 33 degrees and a wedge length of 0.388 mm, and the threads of a standard internally threaded fastener 20 have come into abutment.

Herein, a contrasting comparison was made with a wedge-length 0.388 mm not having a planar section. FIG. 7B is a conceptual diagram illustrating a state in which the threads of an M8 externally threaded fastener (beveled-section-featuring externally threaded fastener 19) designed under the conditions of a wedge angle of 33 degrees and a wedge length of 0.388 mm, and the threads of a standard internally threaded fastener 20 have come into abutment. With the standard internally threaded fastener 20 being of maximum dimensions, the corner portion of the standard internally-threaded-fastener 20 crest 22 was in a state of being pressure-contacted against the beveled section 15 of the beveled-section-featuring externally threaded fastener 19 after their being screwed together advanced. With the standard internally threaded fastener 20 being of minimum dimensions, on the other hand, the threaded fasteners were in a state of being pressed against each other from engagement start.

Figure 8:
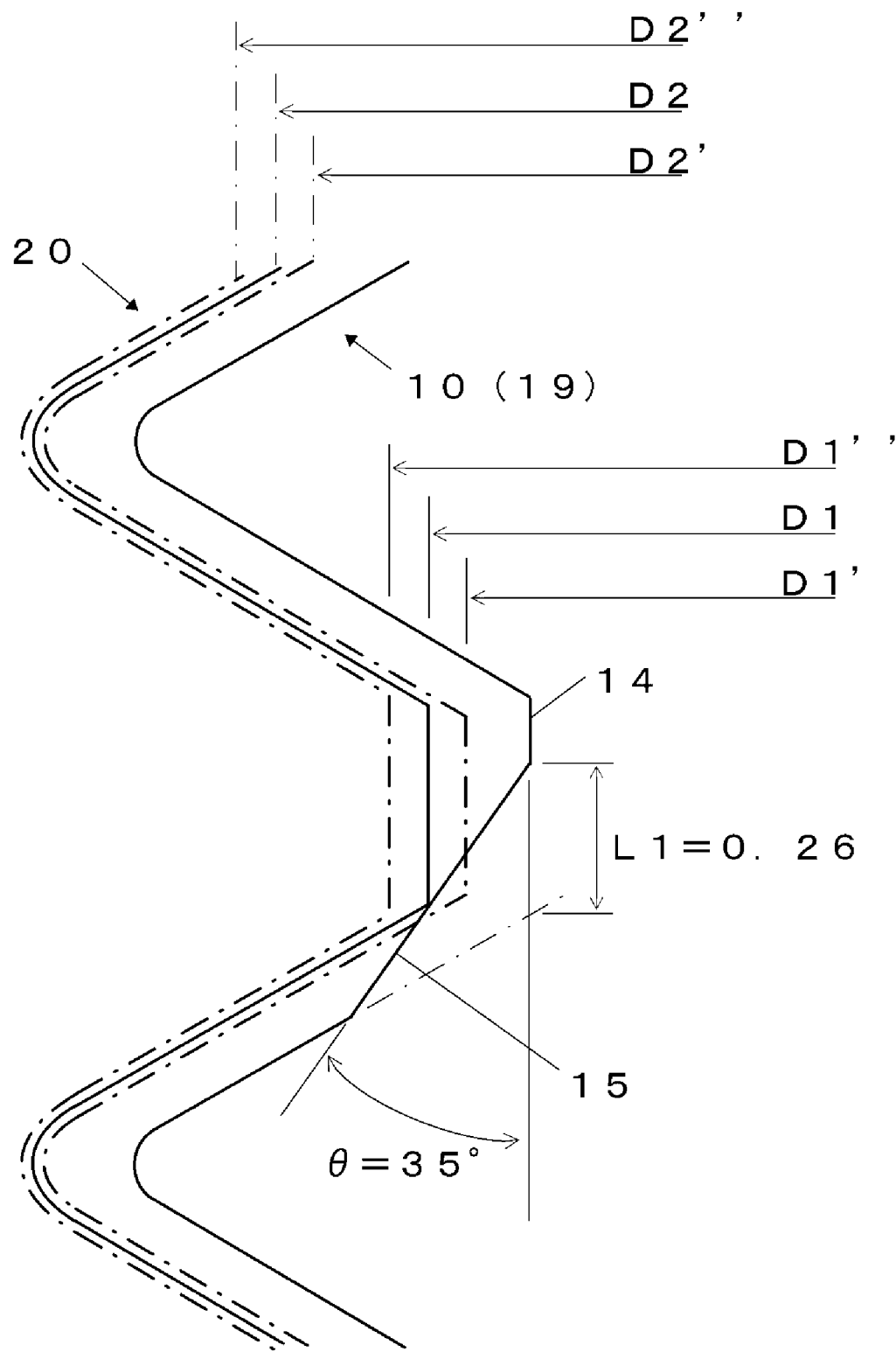
FIG. 8 is a conceptual diagram illustrating a state in which the threads 11 of the anti-loosening metallic externally threaded fastener 10 (M8 externally threaded fastener) involving the present invention, designed under the conditions of a wedge angle of 35 degrees and a wedge length of 0.26 mm, and the threads of a standard internally threaded fastener 20 have come into abutment.

FIG. 8 is a conceptual diagram illustrating a state in which the threads 11 of the anti-loosening metallic externally threaded fastener 10 (M8 externally threaded fastener) involving the present invention, designed under the conditions of a wedge angle of 35 degrees and a wedge length of 0.26 mm, and the threads of a standard internally threaded fastener 20 have come into abutment. With the standard internally threaded fastener 20 being of minimum dimensions, although the degree of abutment between the mutual threaded fasteners at engagement start was greater, it was possible to engage the threaded fasteners with each other via a manual operation. At the same time, with the standard internally threaded fastener 20 being of maximum dimensions, the corner portion of the standard internally-threaded-fastener 20 crest 22 was put into a state of being pressure-contacted against the beveled section 15 of the beveled-section-featuring externally threaded fastener 19 after their being screwed together advanced, wherein discovering that the stated condition also is one of the conditions whereby anti-loosening effectiveness may be demonstrated was possible.

Figure 9:
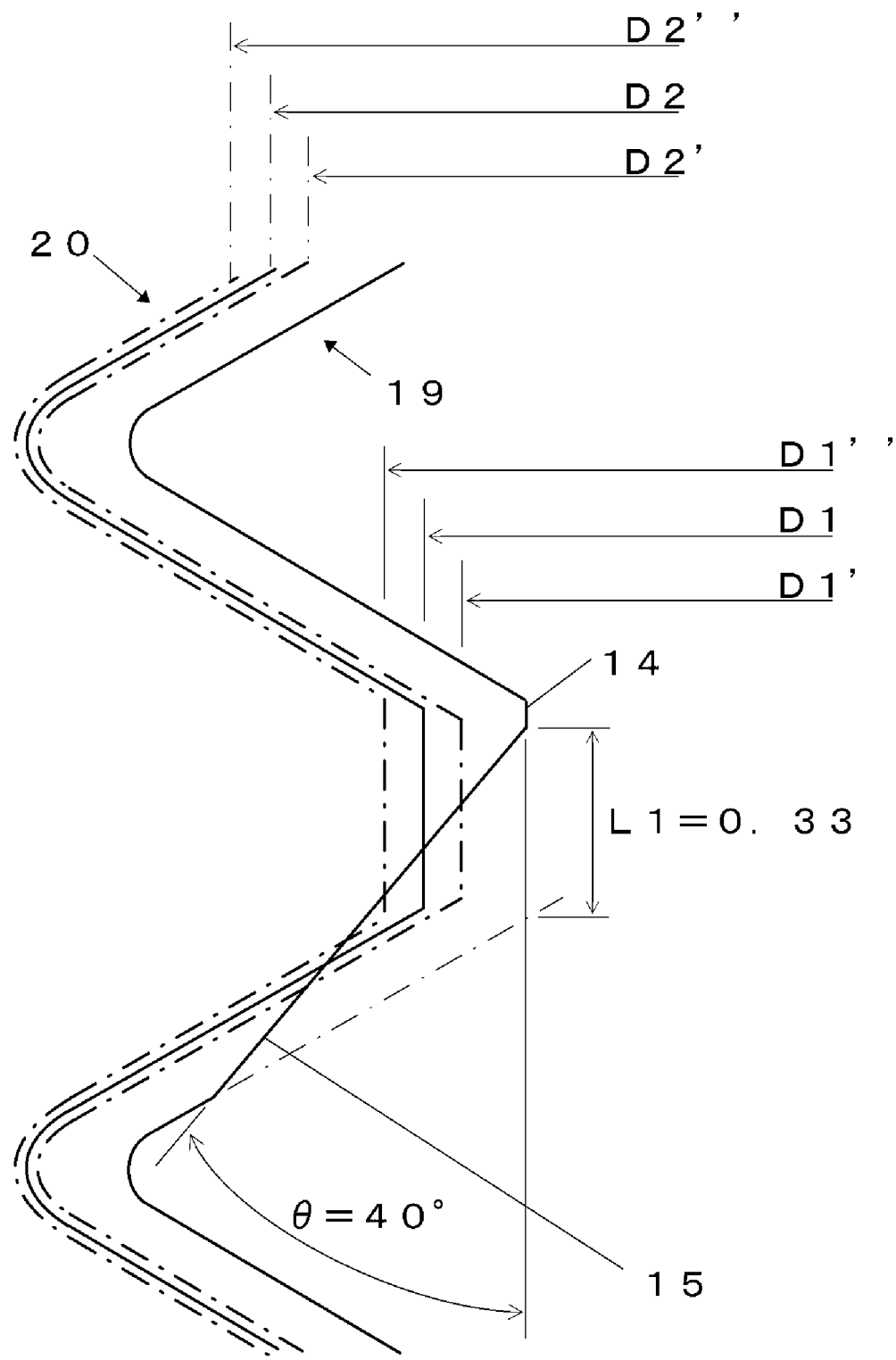
FIG. 9 is a conceptual diagram illustrating a state in which the threads of an M8 externally threaded fastener (beveled-section-featuring externally threaded fastener 19) designed under the conditions of a wedge angle of 40 degrees and a wedge length of 0.33 mm, and the threads of a standard internally threaded fastener 20 have come into abutment.

FIG. 9 is a conceptual diagram illustrating a state in which the threads of an M8 externally threaded fastener (beveled-section-featuring externally threaded fastener 19) designed under the conditions of a wedge angle of 40 degrees and a wedge length of 0.33 mm, and the threads of a standard internally threaded fastener 20 have come into abutment. With the standard internally threaded fastener 20 being of maximum dimensions, the mutual threaded fasteners were in a state in which the corner portion of the standard internally-threaded-fastener 20 crest 22 was in contact with the beveled section 15 of the beveled-section-featuring externally threaded fastener 19 from engagement start, while with the standard internally threaded fastener 20 being of minimum dimensions, the mutual threaded fasteners were in a state of being pressure-contacted against each other from engagement start. When the wedge angle is 40 degrees, the difference from the flank angle is substantially only 20 degrees. If the wedge length is reduced and the length of the planar section 14 is increased, the beveled section 15 cannot be pressure-contacted against the corner portion of the standard internally-threaded-fastener 20 crest 22. In particular, if the corner portion of the standard internally-threaded-fastener 20 crest 22 has been chamfered during machining, the anti-loosening effectiveness will be greatly diminished. Consequently, the stated condition would not be desirable as a condition for preventing loosening.

Figure 10:
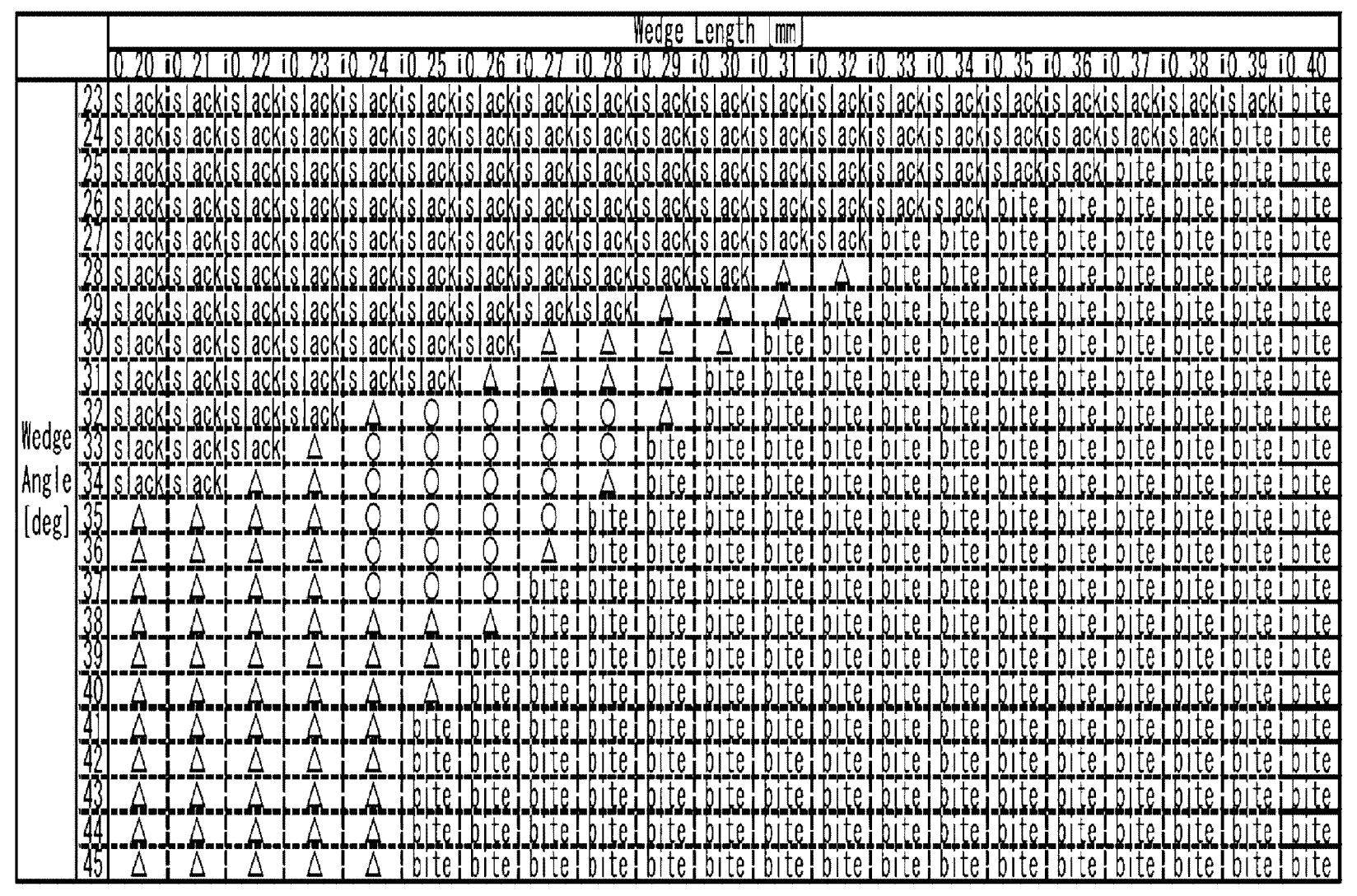

By repeating the above-described tests with different values for the wedge angle and the wedge length, the correlation between the wedge angle and the wedge length was obtained. The results are presented in FIG. 10. FIG. 10 is a table representing a situation in which an M8 externally threaded fastener with a beveled section has been tightened against a standard internally threaded fastener 20 in relation to the M8 threaded fastener wedge angle and wedge length. The number of samples for each combination of wedge angle and wedge angle is ten. The tightening torque for the threaded fastener was made 18 N·m.

The "○" table entries are wedge-angle and wedge-length conditions whereby with the standard internally threaded fastener 20 being of minimum dimensions, although the mutual threaded fasteners lightly abut on each other from engagement start, their pressure-contacting each other could be averted, and whereby with the standard internally threaded fastener 20 being of maximum dimensions, the corner portion of the standard internally-threaded-fastener 20 crest 22 is put into a state of being pressure-contacted against the beveled section 15 of the beveled-section-featuring externally threaded fastener 19 when their being screwed together has advanced, allowing anti-loosening effectiveness to be demonstrated. The threaded fasteners satisfying the stated conditions are most favorably suited as anti-loosening metallic externally threaded fasteners 10 involving the present invention.

The "Δ" table entries are wedge-angle and wedge-length conditions whereby with the standard internally threaded fastener 20 being of minimum dimensions, although the mutual threaded fasteners lightly abut on each other from engagement start, their pressure-contacting each other could be averted, and whereby with the standard internally threaded fastener 20 being of maximum dimensions, the corner portion of the standard internally-threaded-fastener 20 crest 22 is put into a state of being pressure-contacted against the beveled section 15 of the beveled-section-featuring externally threaded fastener 19 when their being screwed together has advanced, but due to indefinite conditions such as the corner portion of the standard internally-threaded-fastener 20 crest 22 having been chamfered during machining, instances in which anti-loosening effectiveness is not obtained occur on the order of 10 percent. However, depending on the vibration conditions of where the threaded fasteners are employed, sufficient anti-loosening effect can be demonstrated.

The "slack" table entries are wedge-angle and wedge-length conditions whereby due primarily to factors the occurrence of a state in which the corner portion of the standard internally-threaded-fastener 20 crest 22 does not come into abutment with beveled section 15 of the beveled-section-featuring externally threaded fastener 19, despite their being screwed together having advanced, loosening occurred following the threaded-fastener-loosening vibration tests specified in the test standards NAS 3350 and NAS 3354.

The "bite" table entries are wedge-angle and wedge-length conditions whereby the corner portion of the standard internally-threaded-fastener 20 crest 22 reaches the interior of the beveled section 15 of the beveled-section-featuring externally threaded fastener 19, and the beveled section 15 of the beveled-section-featuring externally threaded fastener 19 is pressure-contacted against the corner portion of the standard internally-threaded-fastener 20 crest 22 from the beginning of when the beveled-section-featuring externally threaded fastener 19 is engaged with the standard internally threaded fastener 20, creating a situation in which the tightening job cannot be carried out unless a tightening tool is employed.

On the basis of the fastener-loosening vibration tests specified in the test standards NAS 3350 and NAS 3354, tests were conducted on anti-loosening metallic externally threaded fasteners 10 involving the present invention, under the "○" conditions in the FIG. 10 table. Table 1 presents test conditions for the fastener-loosening vibration test specified in the test standards NAS 3350 and NAS 3354, and Table 2 presents the results. The threaded fasteners were screwed into hex nuts at a tightening torque of 18 N·m to anchor them to pedestals, after which together with the anchoring pedestals, they were given 30,000 turns. The unscrewing torque following completion of the test was maintained at 13 N·m or more, wherein the clamping status was normal, and anti-loosening effectiveness was confirmed.

TABLE 1

| | |
|---|---|
| Test Name | Vibration & Shock Test |
| Test Standards | NAS 3350 & NAS 3354 |
| Threaded-Fastener Callout | M8 × 1.25 |
| Sample Names | wedge bolt + S45C nut |
| Test Machine | Vibration Test System G-0215 |
| Test Conditions | Vibration Count: 1760 cycles/minute |
| | Shaking Stroke: 11.2 mm |
| | Thrusting Stroke: 19 mm |
| | Thrusting Period: 30,000 cycles |
| | (17-minute interval) |

TABLE 2

| Sample Names | Number | Tightening Torque [N · m] | Unscrewing Torque [N · m] | Results |
|---|---|---|---|---|
| M8 × 1.25 wedge bolt + S45C nut | 1 | 18 | 15 | Favorable |
| | 2 | 18 | 14 | Favorable |
| | 3 | 18 | 13 | Favorable |

Based on the shear-directed transverse vibration test specified in ISO 16130, tests were conducted on anti-loosening metallic externally threaded fasteners 10 involving the present invention, under the "○" conditions in the FIG. 10 table. Table 3 presents the test conditions for the fastener-loosening vibration test specified in ISO 16130, and the Table 4 presents the results. The threaded fasteners were screwed into hex nuts at a tightening torque of 18 N·m to anchor them to pedestals, after which specified vibration was imparted to them along their shear planes. Favorable results in which 80% of the initial axial force was retained even following completion of the test were obtained.

TABLE 3

| | |
|---|---|
| Test Name | Vibration Test |
| Test Standard | ISO 161130 |
| Threaded-Fastener Callout | M8 × 1.25 |
| Sample Names | wedge bolt + S45C nut |
| Test Machine | Junker Test Machine |
| Test Conditions | Vibration Count: 750 cycles/minute |
| | (12.5 Hz) |
| | Cycle Count: 2000 cycles |
| | Lateral Displacement: 0.427 mm |

TABLE 4

| Sample Names | Number | Tightening Torque [N · m] | Residual Axial Force [%] | Results |
|---|---|---|---|---|
| M8 × 1.25 wedge bolt + S45C nut | 1 | 18 | 80 | Favorable |
| | 2 | 18 | 80 | Favorable |

Within the FIG. 10 table, in cases in which the wedge was sloped at an angle of from 32 degrees to 37 degrees, and in cases in which the wedge length was established at from 0.24 mm to 0.28 mm were found to be favorably suited, with high unscrewing-torque values following the fastener-loosening vibration test as specified in the test standards NAS 3350 and NAS 3354. What is more, in the shear-directed transverse vibration test specified in ISO 16130, good results indicating high residual axial forces were obtained.

FIG. 11 is a table presenting binding force for respective threads versus wedge angle for externally threaded fasteners (beveled-section-featuring externally threaded fasteners 19) provided with the wedge angles and the wedge lengths, in a state of having been tightened. A threaded-fastener finite element analysis was employed to compute the binding force. The tightening torque for externally threaded fasteners (beveled-section-featuring externally threaded fasteners 19) provided with the wedge angles and the wedge lengths, and the standard internally threaded fasteners 20 was 18 N·m. For the wedge lengths, the "○" and "Δ" values in the FIG. 10 table were adopted. In general, as indicated in the uppermost row in FIG. 11, looking at the binding force for the different threads on externally threaded fasteners not furnished with a beveled section 15, when the threaded fasteners are tightened, maximum binding force occurs in the No. 1 thread along the seat, while according as the No. 2 thread and the No. 3 thread are separated from the seat the binding force grows smaller. The beveled-section-featuring externally threaded fasteners 19, as indicated in FIGS. 3A and 3B, by bearing the load at the corner portion of the standard internally-threaded-fastener 20 crests 22 on a single point of the beveled section 15 in the root 13 of the beveled-section-featuring externally threaded fastener 19, apply a more or less large load to No. 1 thread, but it will be appreciated that on the rest of the threads the load is applied almost evenly distributed. Furthermore, the binding force of whichever of the different threads reaches at least twice that of a standard externally threaded fastener 110 not having a beveled section 15, thus demonstrating anti-loosening effectiveness. Accordingly, also a total binding force of at least three times that of a standard externally threaded fastener 110 not having a beveled section 15 may be secured.

From calculating load application rates, which indicate the efficiency of how loads are applied, by dividing the binding force of the No. 5 thread by the binding force of the No. 1 thread: An at least 90% was secured at all wedge angles 28 degrees or more up to 35 degrees.

FIG. 12 is a table presenting binding force for respective threads versus wedge angle for internally threaded fasteners given the wedge angle, in a state of having been tightened. The binding forces of the externally threaded fasteners (beveled-section-featuring externally threaded fastener 19) provided with the wedge angles and the wedge lengths presented in FIG. 11 were for all threads surpassing. Likewise, from calculating the load application rates: There were FIG. 12 wedge angles at which the rate fell below 90%, wherein it will be appreciated that anti-loosening metallic externally threaded fasteners 10 involving the present invention make anti-loosening effectiveness significantly better.

From the foregoing, the optimal conditions for M8-size externally threaded fasteners provided with wedge angles and wedge lengths to demonstrate anti-loosening effectiveness have been derived. In the following, with regard to other sizes, optimal conditions for demonstrating anti-loosening effectiveness are studied. FIGS. 13 through 17 illustrate M3- to M16-size externally threaded fasteners (anti-loosening metallic externally threaded fastener 10 involving the present invention) provided with wedge angles and wedge lengths in a state of abutment with a standard internally threaded fastener 20.

Figure 13:
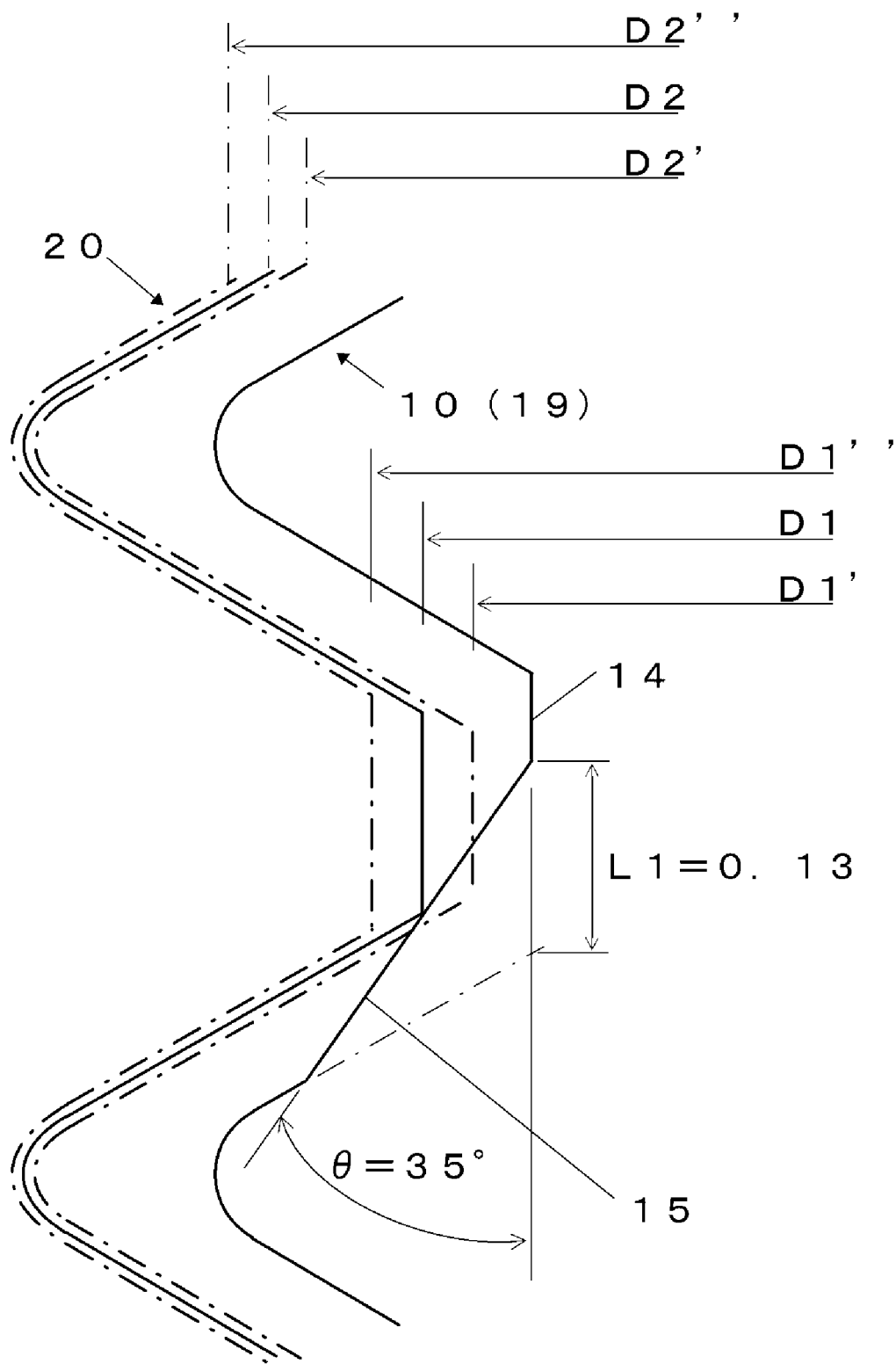
FIG. 13 is a conceptual diagram illustrating a state in which the threads 11 of the anti-loosening metallic externally threaded fastener 10 (M3 externally threaded fastener) involving the present invention, and the threads of a standard internally threaded fastener 20 have come into abutment.

FIG. 13 is a conceptual diagram illustrating a state in which the threads 11 of the anti-loosening metallic externally threaded fastener 10 (M3 externally threaded fastener) involving the present invention, and the threads of a standard internally threaded fastener 20 have come into abutment. The conditions were established at a wedge angle of 35 degrees and a wedge length of 0.13 mm. With the standard internally threaded fastener 20 being of minimum dimensions, the mutual threaded fasteners were in abutment from engagement start, but it was possible to engage the threaded fasteners with each other easily via a manual operation. At the same time, with the standard internally threaded fasteners 20 being of maximum dimensions, the corner portion of the standard internally-threaded-fastener 20 crest 22 was brought into a state of being pressure-contacted against the beveled section 15 of the beveled-section-featuring externally threaded fastener 19 after their being screwed together advanced; that is, the stated conditions are conditions whereby anti-loosening effectiveness may be demonstrated.

Figure 14:
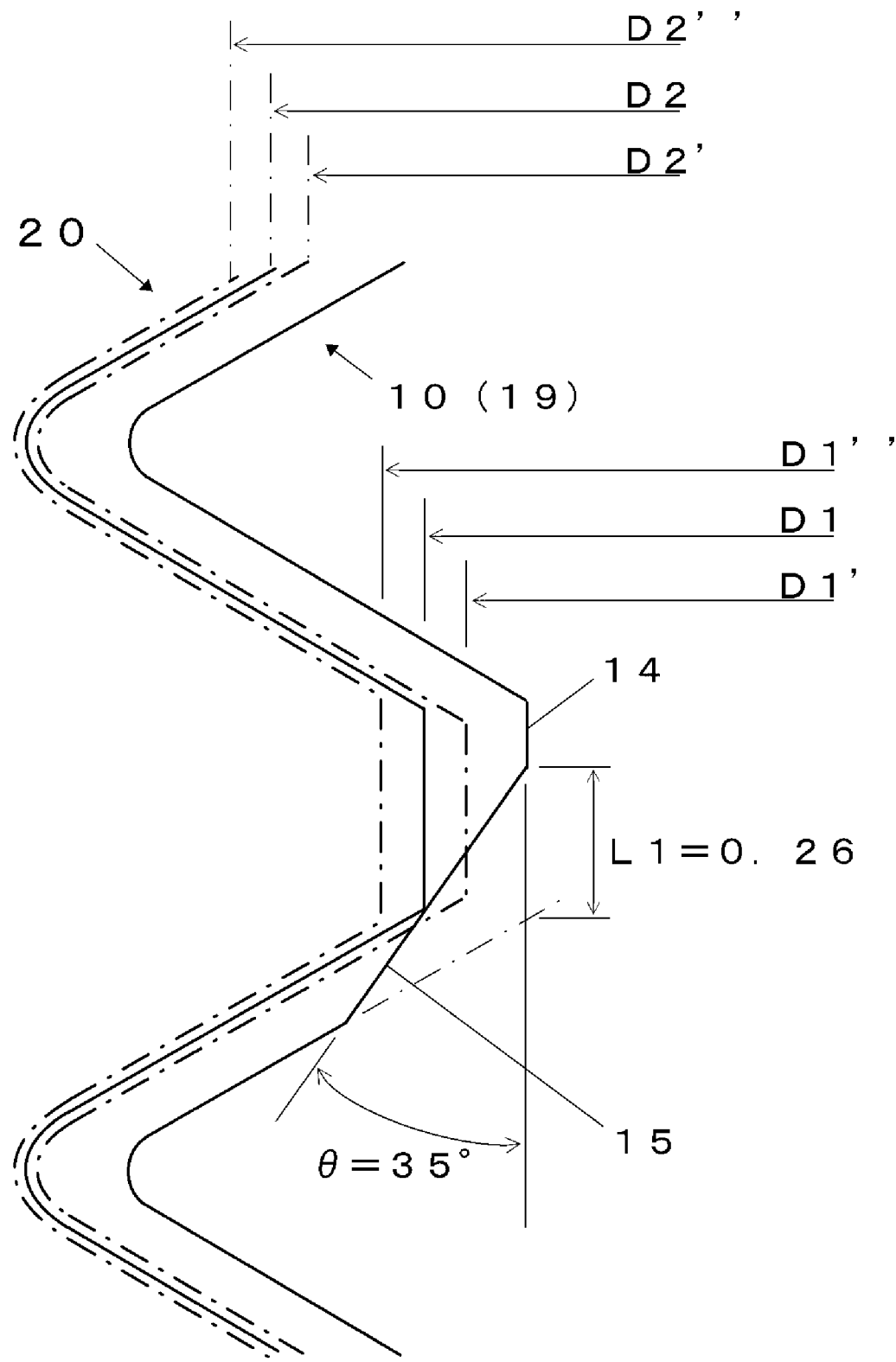
FIG. 14 is a conceptual diagram illustrating a state in which the threads 11 of the anti-loosening metallic externally threaded fastener 10 (M6 externally threaded fastener) involving the present invention, and the threads of a standard internally threaded fastener 20 have come into abutment.

FIG. 14 is a conceptual diagram illustrating a state in which the threads 11 of the anti-loosening metallic externally threaded fastener 10 (M6 externally threaded fastener) involving the present invention, and the threads of a standard internally threaded fastener 20 have come into abutment. The conditions were established at a wedge angle of 35 degrees and a wedge length of 0.26 mm. With the standard internally threaded fastener 20 being of minimum dimensions, the mutual threaded fasteners were in abutment from engagement start, but it was possible to engage the threaded fasteners with each other easily via a manual operation. At the same time, with the standard internally threaded fasteners 20 being of maximum dimensions, the corner portion of the standard internally-threaded-fastener 20 crest 22 was brought into a state of being pressure-contacted against the beveled section 15 of the beveled-section-featuring externally threaded fastener 19 after their being screwed together advanced; that is, the stated conditions are conditions whereby anti-loosening effectiveness may be demonstrated.

Figure 15:
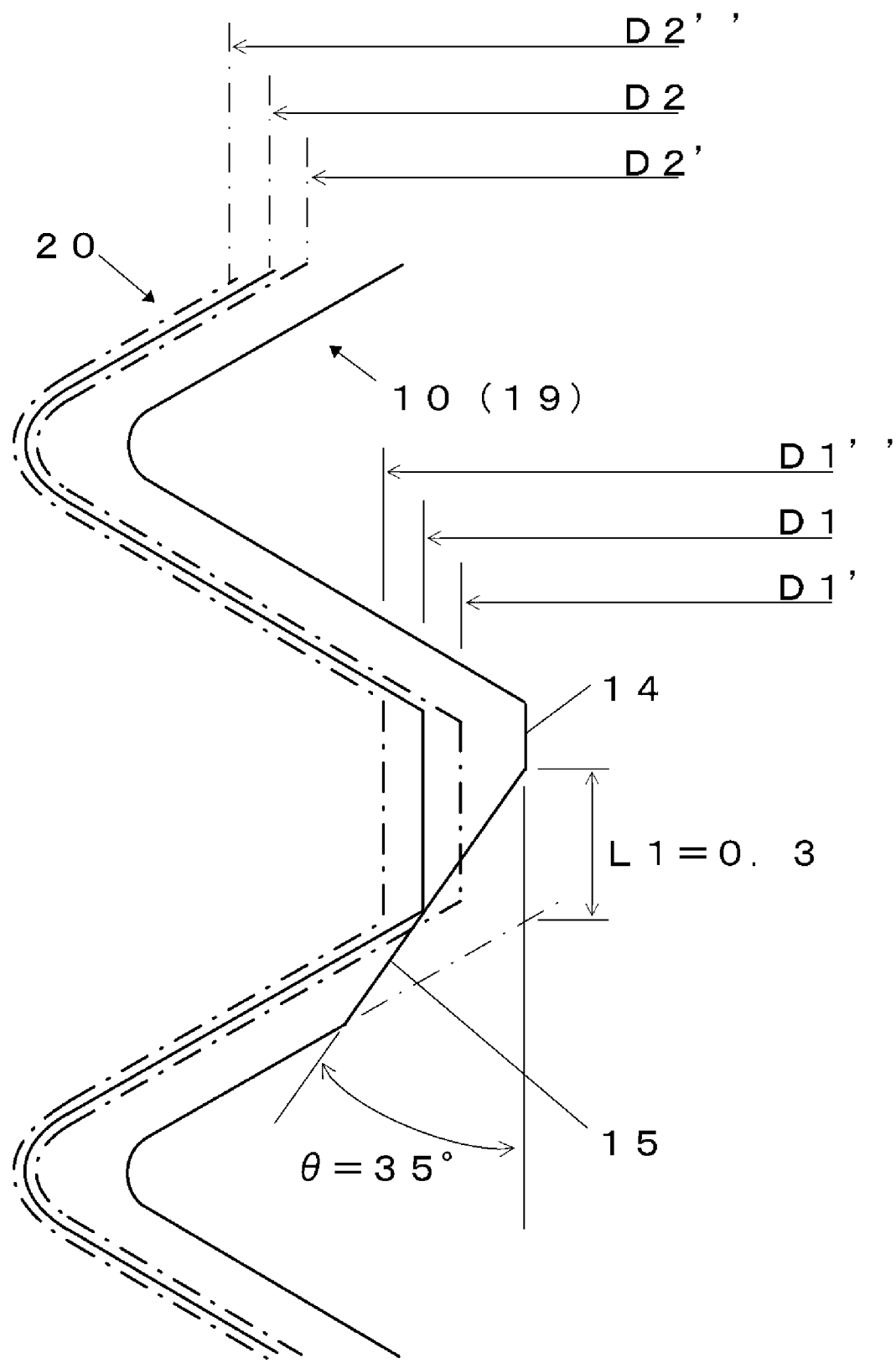
FIG. 15 is a conceptual diagram illustrating a state in which the threads 11 of the anti-loosening metallic externally threaded fastener 10 (M10 externally threaded fastener) involving the present invention, and the threads of a standard internally threaded fastener 20 have come into abutment.

FIG. 15 is a conceptual diagram illustrating a state in which the threads 11 of the anti-loosening metallic externally threaded fastener 10 (M10 externally threaded fastener) involving the present invention, and the threads of a standard internally threaded fastener 20 have come into abutment. The conditions were established at a wedge angle of 35 degrees and a wedge length of 0.3 mm. With the standard internally threaded fastener 20 being of minimum dimensions, the mutual threaded fasteners were in abutment from engagement start, but it was possible to engage the threaded fasteners with each other easily via a manual operation. At the same time, with the standard internally threaded fastener 20 being of maximum dimensions, the corner portion of the standard internally-threaded-fastener 20 crest 22 was brought into a state of being pressure-contacted against the beveled section 15 of the beveled-section-featuring externally threaded fastener 19 after their being screwed together advanced; that is, the stated conditions are conditions whereby anti-loosening effectiveness may be demonstrated.

Figure 16:
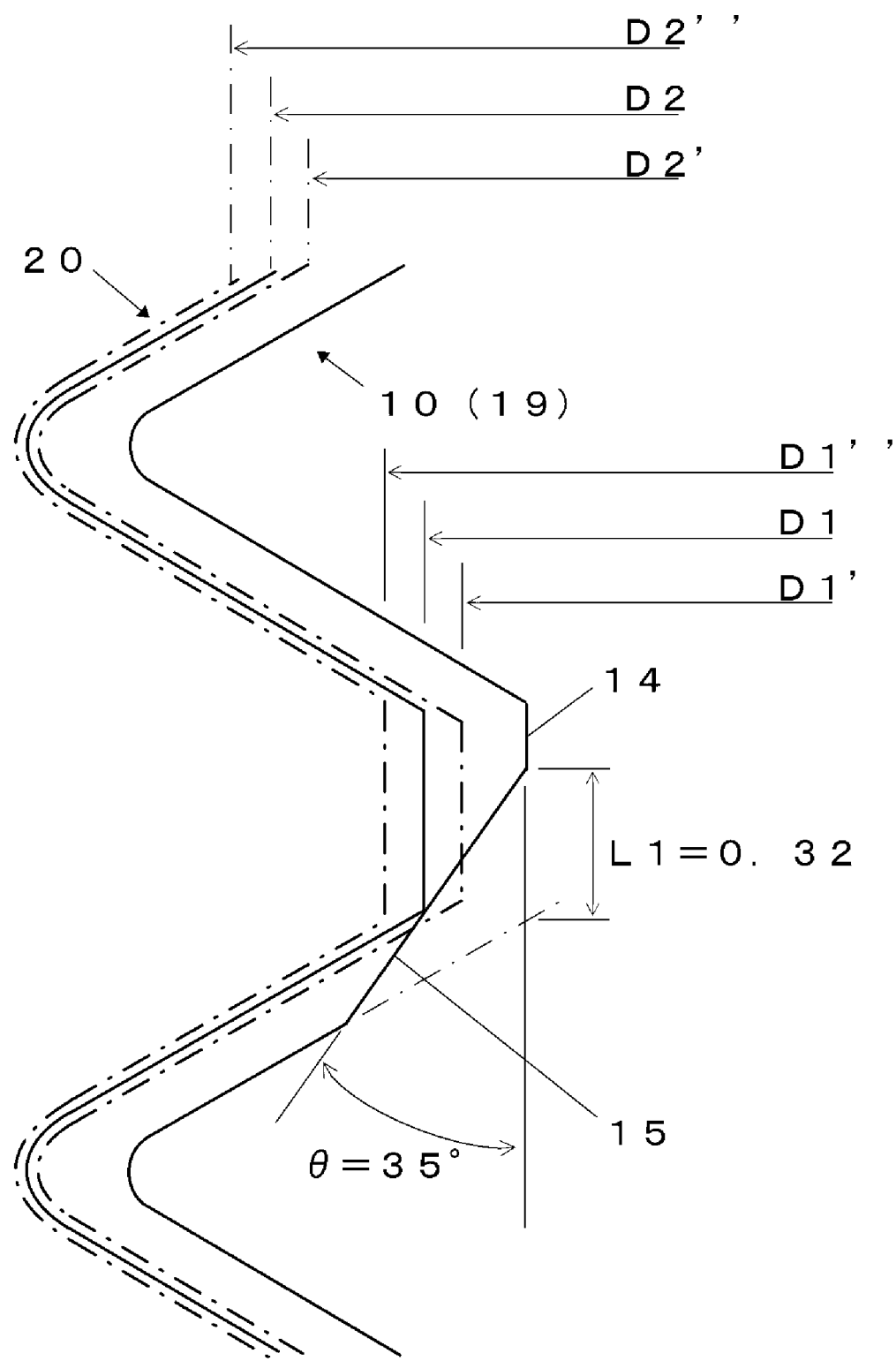
FIG. 16 is a conceptual diagram illustrating a state in which the threads 11 of the anti-loosening metallic externally threaded fastener 10 (M12 externally threaded fastener) involving the present invention, and the threads of a standard internally threaded fastener 20 have come into abutment.

FIG. 16 is a conceptual diagram illustrating a state in which the threads 11 of the anti-loosening metallic externally threaded fastener 10 (M12 externally threaded fastener) involving the present invention, and the threads of a standard internally threaded fastener 20 have come into abutment. The conditions were established at a wedge angle of 35 degrees and a wedge length of 0.32 mm. With the standard internally threaded fastener 20 being of minimum dimensions, the mutual threaded fasteners were in abutment from engagement start, but it was possible to engage the threaded fasteners with each other easily via a manual operation. At the same time, with the standard internally threaded fasteners 20 being of maximum dimensions, the corner portion of the standard internally-threaded-fastener 20 crest 22 was brought into a state of being pressure-contacted against the beveled section 15 of the beveled-section-featuring externally threaded fastener 19 after their being screwed together advanced; that is, the stated conditions are conditions whereby anti-loosening effectiveness may be demonstrated.

Figure 17:
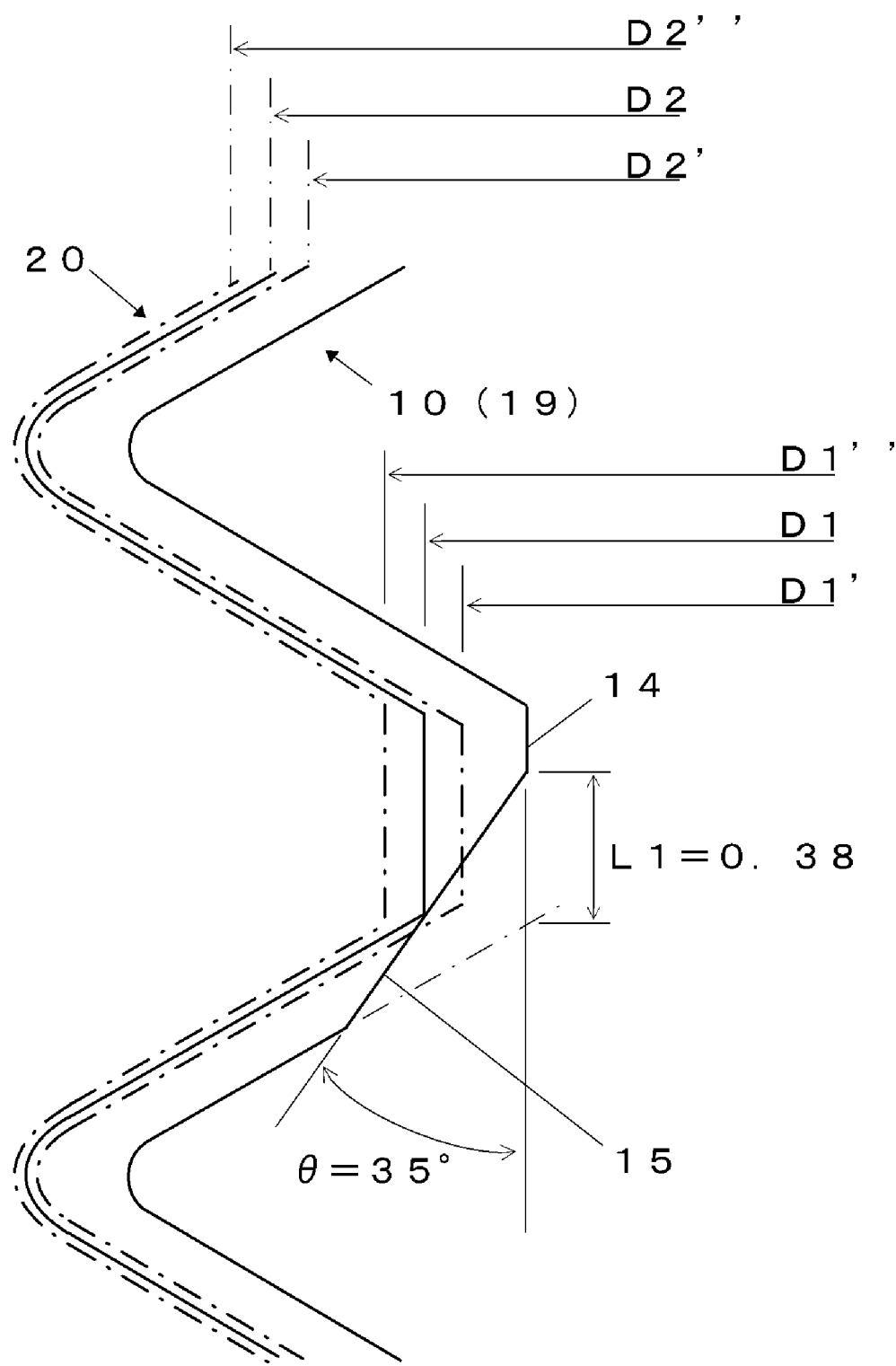
FIG. 17 is a conceptual diagram illustrating a state in which the threads 11 of the anti-loosening metallic externally threaded fastener 10 (M16 externally threaded fastener) involving the present invention, and the threads of a standard internally threaded fastener 20 have come into abutment.

FIG. 17 is a conceptual diagram illustrating a state in which the threads 11 of the anti-loosening metallic externally threaded fastener 10 (M16 externally threaded fastener) involving the present invention, and the threads of a standard internally threaded fastener 20 have come into abutment. The conditions were established at a wedge angle of 35 degrees and a wedge length of 0.38 mm. With the standard internally threaded fastener 20 being of minimum dimensions, the mutual threaded fasteners were in abutment from engagement start, but it was possible to engage the threaded fasteners with each other easily via a manual operation. At the same time, with the standard internally threaded fastener 20 being of maximum dimensions, the corner portion of the standard internally-threaded-fastener 20 crest 22 was brought into a state of being pressure-contacted against the beveled section 15 of the beveled-section-featuring externally threaded fastener 19 after their being screwed together advanced; that is, the stated conditions are conditions whereby anti-loosening effectiveness may be demonstrated.

As in the case of the M8 externally threaded fastener, by repeating the test with different values of wedge angle and wedge length, it was possible to obtain a correlation between wedge angle and wedge length. The same correlation as in the table presented in FIG. 10 was derived for sizes from M3 to M16, whereupon for any of the sizes, wedge angles from 32 to 37 degrees were most favorably suited.

It may be readily understood that wedge length varies according to size of the different threaded fasteners. Therein, the ratio of the length L1 from the intersection of the line extending from the planar section 14 and the line extending from the compressing flank 16 of the externally threaded fastener provided with the wedge angles and the wedge lengths to the intersection of the planar section 14 and the beveled section 15, divided by the length L2 from the intersection of the line extending from the planar section 14 and the line extending from the compressing flank 16 to the edge of the planar section 14 along its non-compressing flank 17 side, was calculated, whereupon values from 0.60 times or greater to within 0.75 times were found to be most favorably suited in externally threaded fasteners provided with the wedge angles and the wedge lengths of any of the sizes.

From the foregoing, it has been derived that with externally threaded fasteners of from M3 to M16 size provided with the wedge angles and the wedge lengths, the optimal conditions under which loosening does not occur following the threaded-fastener-loosening vibration tests specified in the test standards NAS 3350 and NAS 3354 lie in instances in which the wedge angle was sloped at 32 degrees or more to within 37 degrees, and instances in which the ratio of L1 divided by L2 was established at a value of 0.60 times or more to within 0.75 times.

UTILIZABILITY IN INDUSTRY

Utilization is possible in all manner of facilities, equipment, and devices in which fastening members are employed to carry out anchoring in sites accompanied by vibration.

EXPLANATION OF REFERENCE MARKS

10 Anti-loosening metallic externally threaded fastener (wedge bolt)
11 Thread (anti-loosening metallic externally threaded fastener)
12 Crest
13 Root
14 Planar section
15 Beveled section
16 Compressing flank
17 Non-compressing flank
19 Externally threaded fastener featuring beveled section
20 Standard internally threaded fastener
21 Thread (standard internally threaded fastener)
22 Crest (standard internally threaded fastener)
23 Root (standard internally threaded fastener)
26 Compressing flank (standard internally threaded fastener)
27 Non-compressing flank (standard internally threaded fastener)
30 Fastened object
110 Standard externally threaded fastener
111 Thread (standard externally threaded fastener)
112 Crest (standard externally threaded fastener)
113 Root (standard externally threaded fastener)
116 Compressing flank (standard externally threaded fastener)
120 Anti-loosening internally threaded fastener
122 Beveled section (anti-loosening internally threaded fastener)
130 Radial binding force by threaded fastener
L1 Wedge length
L2 Root length
d Wedge bolt outer diameter
d' Standard bolt outer diameter
D1 Internally-threaded-fastener inner diameter (standard)
D1' Internally-threaded-fastener inner diameter (minimum)
D1" Internally-threaded-fastener inner diameter (maximum)
D2 Effective diameter (standard)
D2' Effective diameter (minimum)
D2" Effective diameter (maximum)
θ Wedge angle

What is claimed is:

1. In metallic externally threaded fasteners for interlocking with metric-screw internally threaded fasteners, an anti-loosening metallic fastener externally threaded with threads, the anti-loosening metallic externally threaded fastener:
    characterized in being formed with
        roots, in cross-sectional form, of the anti-loosening metallic externally threaded fastener constituted with a planar section along a non-compressing flank of the threads being in a planar form axially paralleling the anti-loosening metallic externally threaded fastener, and constituted with a beveled section along a compressing flank of the threads being in a form beveled, with respect to a line extending from the planar section, heading toward the compressing flank; and
        the anti-loosening metallic externally threaded fastener outer-diametric dimensionally and effective-diametric dimensionally being smaller than metric-screw reference dimensions; and
    characterized in being constituted with a length from an intersection of the line extending from the planar section and a line extending from the compressing flank, to an intersection of the planar section and the beveled section being determined to be from 0.60 times to within 0.75 times a length from the intersection of the line extending from the planar section and the line extending from the compressing flank, to an edge of the planar section along its non-compressing flank side.

2. The anti-loosening metallic externally threaded fastener set forth in claim 1, characterized in that in being screw-clamped together with an internally threaded fastener, the beveled section, and a thread-crest corner portion along the compressing flank of the internally threaded fastener, alone are brought into pressure-contact.

3. The anti-loosening metallic externally threaded fastener set forth in claim 1, characterized in being constituted in a form in which the beveled section is sloped heading toward the compressing flank at an angle with respect to the anti-loosening metallic externally threaded fastener axially of from 32 degrees to within 37 degrees.

4. In metallic externally threaded fasteners for interlocking with metric-screw internally threaded fasteners, an anti-loosening metallic fastener externally threaded with threads, the anti-loosening metallic externally threaded fastener:
    characterized in being formed with
        roots, in cross-sectional form, of the anti-loosening metallic externally threaded fastener constituted with a planar section along a non-compressing flank of the threads being in a planar form axially paralleling the anti-loosening metallic externally threaded fastener, and constituted with a beveled section along a compressing flank of the threads being in a form beveled, with respect to a line extending from the planar section, heading toward the compressing flank; and
        the anti-loosening metallic externally threaded fastener outer-diametric dimensionally and effective-diametric dimensionally being smaller than metric-screw reference dimensions;
    characterized in being constituted with a length from an intersection of the line extending from the planar section and a line extending from the compressing flank, to an intersection of the planar section and the beveled section being determined to be from 0.60 times to within 0.75 times a length from the intersection of the line extending from the planar section and the line extending from the compressing flank, to an edge of the planar section along its non-compressing flank side; and
    characterized in that in being screw-clamped together with an internally threaded fastener, the beveled section, and a thread-crest corner portion along the compressing flank of the internally threaded fastener, alone are brought into pressure-contact.

5. The anti-loosening metallic externally threaded fastener set forth in claim 4, characterized in being constituted in a form in which the beveled section is sloped heading toward the compressing flank at an angle with respect to the anti-loosening metallic externally threaded fastener axially of from 32 degrees to within 37 degrees.

* * * * *